United States Patent
Hasegawa et al.

(10) Patent No.: US 6,344,889 B1
(45) Date of Patent: Feb. 5, 2002

(54) LIQUID CRYSTAL DISPLAY AND METHOD OF MANUFACTURING THE SAME

(75) Inventors: Rei Hasegawa, Yokohama; Takeshi Yamaguchi, Fukaya; Rieko Fukushima, Yokohama; Hajime Yamaguchi, Yokohama; Kohki Takatoh, Yokohama, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/527,543

(22) Filed: Mar. 16, 2000

(30) Foreign Application Priority Data

Mar. 19, 1999 (JP) .............................. 11-074850

(51) Int. Cl.$^7$ .................. G02F 1/1337; G02F 1/13; G02F 1/141
(52) U.S. Cl. ..................... 349/129; 349/172; 349/37
(58) Field of Search ................... 349/141, 172, 349/129, 37

(56) References Cited

U.S. PATENT DOCUMENTS

| | | | | |
|---|---|---|---|---|
| 5,612,802 A | * | 3/1997 | Okada et al. ................. | 349/129 |
| 5,633,740 A | * | 5/1997 | Asaoka et al. ............... | 349/129 |
| 5,754,265 A | * | 5/1998 | Inaba .......................... | 349/129 |
| 6,128,058 A | * | 10/2000 | Walton ........................ | 349/129 |
| 6,133,974 A | * | 10/2000 | Ishii ............................ | 349/129 |

FOREIGN PATENT DOCUMENTS

| | | |
|---|---|---|
| JP | 9-120065 | 5/1997 |
| JP | 10-221718 | 8/1998 |

OTHER PUBLICATIONS

J.S. Patel et al., "Alignment of Liquid Crystals Which Exhibit Cholesteric to Smectic C* Phase Transitions", J. Appl. Phys., vol. 59, No. 7, pp. 2355–2360, (1986).

J. Fünfschilling et al., "New Ferroelectric Displays and Operation Modes", Ferroelectrics, vol. 213, pp. 195–208, (1998).

L. Komitov et al., "On the Seemingly Antiferroelectric Behaviour of Certain Ferroelectric Liquid Crystals", Ferroelectrics, vol. 189, pp. 199–210, (1996).

* cited by examiner

Primary Examiner—Toan Ton
(74) Attorney, Agent, or Firm—Finnegan, Henderson, Farbow, Garrett, & Dunner, L.L.P.

(57) ABSTRACT

In a liquid crystal display in which a liquid crystal having spontaneous polarization is sandwiched between substrates, liquid crystal alignment which achieves a wide viewing angle and hardly causes alignment destruction is readily formed. A common electrode is formed by a pair of meshed comb electrodes, and rubbing alignment is performed in the logitudinal direction of teeth of these comb electrodes. When the liquid crystal material transits from a nematic phase or an isotropic phase to a chiral smectic C phase, a positive DC voltage, for example, is applied between a pixel electrode and one of the comb common electrodes, and a negative voltage is applied between a pixel electrode and the other comb common electrode. This readily accomplishes liquid crystal alignment in which smectic layers bend horizontally with respect to the substrate surface in space portions between the interdigitated teeth of the comb electrodes.

15 Claims, 13 Drawing Sheets

LIQUID CRYSTAL DISPLAY AND METHOD OF MANUFACTURING THE SAME

CROSS-REFERENCE TO RELATED APPLICATIONS

This application is based upon and claims the benefit of priority from the prior Japanese Patent Application No. 11-74850, filed Mar. 19, 1999, the entire contents of which are incorporated herein by reference.

BACKGROUND OF THE INVENTION

The present invention relates to a liquid crystal display using a liquid crystal material having spontaneous polarization and a method of manufacturing the same.

A liquid crystal display has characteristic features such as low consumption power, light weight, and small height and is therefore extensively used as the monitor display of a personal computer, a car navigation system, or the like. However, when compared to a CRT this liquid crystal display has disadvantages such as a low response speed and a narrow viewing angle. As the size and resolution of a liquid crystal display increase, demands for a high response speed and a wide viewing angle are increasing.

A liquid crystal display using a liquid crystal having spontaneous polarization has attracted attention as a display mode capable of high-speed response. Normally, spontaneous polarization is exploited as an intrinsic characteristic or induced by application of an electric field. Examples of a liquid crystal material like this are a ferroelectric liquid crystal (including an SS-FLC (Surface Stabilized Ferroelectric Liquid Crystal), a surface stabilized monostable ferroelectric liquid crystal, a DHF (Deformed Helix Ferroelectric liquid crystal), a twisted FLC (Ferroelectric Liquid Crystal), an APD (Alternating Polarization Domain), and a polymer stabilized ferroelectric liquid crystal), an anti-ferroelectric liquid crystal (including a thresholdless anti-ferroelectric liquid crystal), and a liquid crystal having an electro-clinic effect.

The operation principle of the aforementioned display mode is to transmit/intercept light by using the property that the optical axis of a liquid crystal, which is sandwiched between two polarizing plates whose transmission axes are shifted 90° and which can be regarded as a uniaxial crystal, rotate in the plane parallel to the substrate to which the polarizing plate is attached. In this display mode, inconvenience such as a color change occurs when the liquid crystal display is viewed obliquely. This is so because the apparent liquid crystal refractive index when a liquid crystal display is observed in a direction parallel to the optical axis of a liquid crystal differs from that when the display is viewed in a direction perpendicular to the optical axis.

To solve this inconvenience, Jpn. Pat. Appln. KOKAI Publication No. 9-120065 has proposed a method which increases the viewing angle by forming two regions where alignment directions are perpendicular to each other.

In a liquid crystal display described in Jpn. Pat. Appln. KOKAI Publication No. 9-120065, the area of two regions where alignment directions are perpendicular to each other is as small as about the pixel size which is generally a few tens of $\mu$m to several hundred $\mu$m. Mask rubbing is used to make the alignment directions of these regions different from each other. Mask rubbing is performed by steps of 1) coating a rubbed alignment film with a photoresist, 2) pre-baking, 3) mask exposure, 4) development, 5), post-baking 6) rubbing, 7) photoresist removal, and 8) alignment film cleaning. Mask rubbing thus having complicated steps increases the manufacturing cost, and this lowers the yield.

Jpn. Pat. Appln. KOKAI Publication No. 9-120065 has also proposed a method of forming the two regions only by making the alignment directions of upper and lower substrates perpendicular to each other. Although the steps of this method are simple, the method is inapplicable to a liquid crystal having a nematic phase or an isotropic phase on the high-temperature side of a chiral smectic C phase. This is because a liquid crystal having this phase sequence has no smectic A phase and hence is set in a twisted state when the alignment directions of upper and lower substrates are perpendicular to each other, so it is impossible to form two regions having different smectic layer directions.

A method of forming two regions having different smectic layer directions by using a liquid crystal having a nematic phase or an isotropic phase on the high-temperature side of a chiral smectic C phase is disclosed in, e.g., Jpn. Pat. Appln. KOKAI Publication No. 10-221718. In this method, a liquid crystal is filled into a liquid crystal cell having an alignment film under heating and phase-transited by cooling from a nematic phase or an isotropic phase into a chiral smectic C phase, thereby forming the two regions.

When the method described in this Jpn. Pat. Appln. KOKAI Publication No. 10-221718 is used, it is possible to form two regions having different smectic layer directions by using a liquid crystal having a nematic phase or an isotropic phase on the high-temperature side of a chiral smectic C phase. However, this method has the problem that although the two regions can be formed, locations where these two regions are formed cannot be controlled. In some cases, a desired viewing angle or desired gray scale display cannot be obtained.

BRIEF SUMMARY OF THE INVENTION

It is an object of the present invention to provide a liquid crystal display having a wide viewing angle and a liquid crystal display manufacturing method capable of obtaining a liquid crystal display having a wide viewing angle with simple steps.

To achieve the above object, a liquid crystal display according to the first aspect of the present invention comprises a first substrate, a second substrate opposing the first substrate, a liquid crystal material sandwiched between the first and the second substrate and having spontaneous polarization which has one of a nematic phase and an isotropic phase on a high-temperature side of a chiral smectic C phase, a first region of a portion of the liquid crystal material, and a second region of the liquid crystal material adjacent to the first region, wherein the liquid crystal material is aligned such that the direction of a smectic layer in the liquid crystal material in the first region is different from that in the liquid crystal material in the second region.

Also, a liquid crystal display according to the second aspect of the present invention comprises a first substrate, a second substrate opposing the first substrate, a plurality of pixel electrodes formed on a surface of the first substrate which opposes the second substrate, a pair of comb common electrodes formed on that surface of the second substrate, which opposes the first substrate, and having a plurality of interdigitated teeth, and a liquid crystal material sandwiched between the first and the second substrate and having spontaneous polarization which has one of a nematic phase and an isotropic phase on a high-temperature side of a chiral smectic C phase, wherein a direction of a smectic layer in the liquid crystal material in a first region sandwiched between one of the comb common electrodes and the pixel electrode is different from a direction of a smectic layer in the liquid crystal material in a second region sandwiched between the other of the comb common electrodes and the pixel electrode.

The liquid crystal displays according to the first and second aspects described above are preferably constituted as follows.

An angle the smectic layer in the first region makes with that in the second region is 115 to 155°

The first substrate has a plurality of pixel regions, the first and the second region are present in each of the plurality of pixel regions, and volumes of the liquid crystal material in the first and the second region are substantially equal.

Letting p be a chiral pitch of the liquid crystal material and d be a distance between the first and the second substrate, d<p.

A tilt angle of the liquid crystal material is substantially 22.5°.

The liquid crystal display according to the first aspect is desirably practiced such that the first substrate has a plurality of pixel regions, each of the plurality of pixel regions is divided into two regions correspondingly to the first and the second region, and a direction of a dividing line for dividing each of the plurality of pixel regions into the two regions is substantially parallel to an alignment direction of the liquid crystal material with no voltage applied.

The liquid crystal display according to the second aspect is desirably practiced as follows.

A longitudinal direction of the plurality of teeth of the comb common electrodes is substantially parallel to an alignment direction of the liquid crystal material with no voltage applied.

A pitch of the plurality of teeth of the comb common electrodes is shifted a substantially half period from a pitch of the plurality of pixel electrodes.

A pitch of the plurality of teeth of the comb common electrodes is 500 µm or less.

The liquid crystal display further comprises a plurality of capacitor lines formed on the first substrate so as to oppose a plurality of space portions between the plurality of interdigitated teeth of the comb common electrodes.

A method of manufacturing a liquid crystal display according to the third aspect of the present invention comprises the steps of opposing a first and a second substrate to each other, sandwiching between the first and the second substrate a liquid crystal material having spontaneous polarization which has one of a nematic phase and an isotropic phase on a high-temperature side of a chiral smectic C phase, and forming a first and a second region differing in a direction of a smectic layer in the liquid crystal material, by applying voltages having different polarities to the liquid crystal material in the first and the second region when the liquid crystal material transits from one of the nematic phase and the isotropic phase to the chiral smectic C phase.

The step of opposing the first and the second substrate to each other desirably includes the step of opposing a plurality of pixel electrodes formed on that surface of the first substrate, which opposes the second substrate, to a pair of comb common electrodes formed on that surface of the second substrate, which opposes the first substrate, and having interdigitated teeth, and the step of forming the first and the second region desirably includes the step of forming the first region by applying a voltage of one polarity to the liquid crystal material in a region sandwiched between one of the comb common electrodes and a corresponding one of the plurality of pixel electrodes, and forming the second region by applying a voltage of polarity opposite to the one polarity to a region sandwiched between the other of the comb common electrodes and a corresponding one of the plurality of pixel electrodes.

The step of forming the first and the second region desirably includes the step of making volumes of the first and the second region substantially equal to each other.

The step of forming the first and the second region desirably includes the steps of allowing a direction of a smectic layer in the liquid crystal material in the first region and a direction of a smectic layer in the liquid crystal material in the second region to form an angle of 115 to 155°.

The step of forming the first and the second region desirably includes the step of performing an alignment treatment for an alignment film in parallel with a longitudinal direction of teeth of the comb common electrode, such that the longitudinal direction of the teeth of the comb common electrodes is substantially parallel to an alignment direction of the liquid crystal material with no voltage applied.

In the present invention, when a liquid crystal material transits from a nematic phase or an isotropic phase to a chiral smectic C phase, a voltage of the one polarity is applied to the liquid crystal material in a first region, and a voltage of polarity opposite to the one polarity is applied to the liquid crystal material in a second region. This forms the first and second regions differing in the direction of smectic layers in the liquid crystal material. Since the two regions having different smectic layer directions are formed by application of voltages having opposite polarities, locations where these two regions are formed are controllable. So, a desired wide viewing angle can be obtained. Also, since locations where the two regions are formed can be controlled only by application of voltages, a liquid crystal display having a wide viewing angle can be obtained with simple steps.

As a practical means for applying opposite polarities to a liquid crystal material, a pair of comb electrodes formed on that surface of a second substrate, which opposes a first substrate, and having interdigitated teeth are used as common electrodes. A voltage of one polarity is applied to one of these comb electrodes, and a voltage of opposite polarity is applied to the other. Consequently, a region sandwiched between one comb electrode and a pixel electrode becomes a first region, and a region sandwiched between the other comb electrode and a pixel electrode becomes a second region.

A liquid crystal material having spontaneous polarization has smectic layers. If the interval between these smectic layers changes due to external force, the changed layer interval cannot be restored even when the external force is removed. Therefore, when the display surface of a liquid crystal display using a liquid crystal material having general spontaneous polarization is pushed with a finger, inferior display called alignment destruction occurs. In the present invention, however, two regions having different smectic layer directions are formed. Accordingly, the propagation of external force which changes layers can be interrupted by the boundary between the first and second regions, thereby preventing alignment destruction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Before explanation of embodiments, the gist of the present invention will be described.

Figure 1:
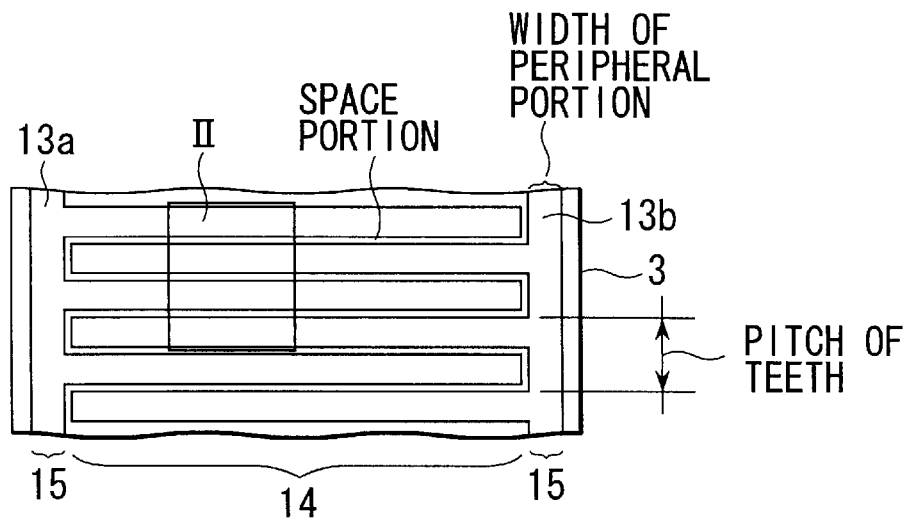
FIG. 1 is a partial plan view showing the arrangement of common electrodes of a liquid crystal display of the present invention.
Figure 2:
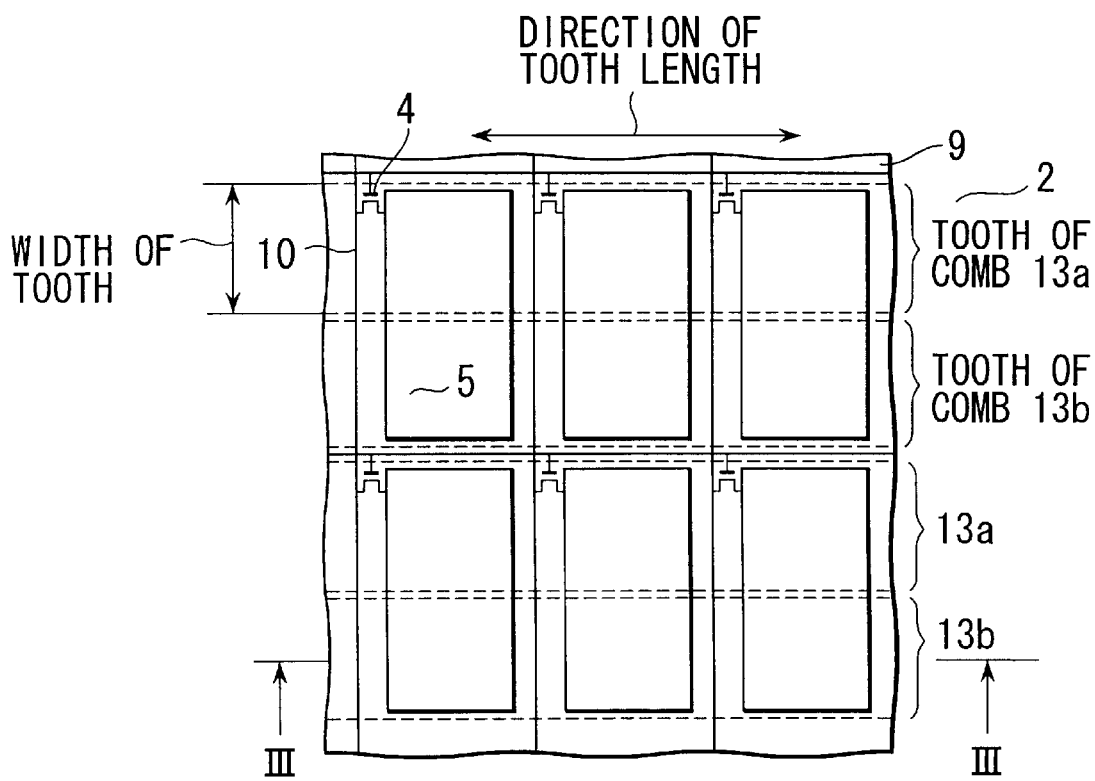
FIG. 2 is a partial plan view showing the arrangement of electrodes in the liquid crystal display of the present invention.
Figure 3:
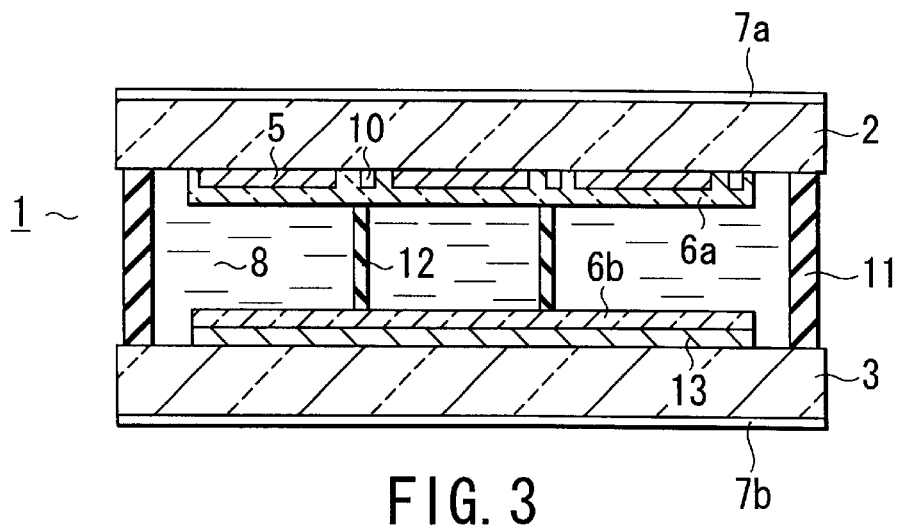
FIG. 3 is a sectional view taken along a line III—III in FIG. 2.

FIG. 1 is a plan view showing a portion of a second substrate of a representative liquid crystal display of the present invention. FIG. 2 is an enlarged view of a portion II in FIG. 1, i.e., a partial plan view showing the arrangement of electrodes in the liquid crystal display. FIG. 3 is a sectional view taken along a line III—III in FIG. 2. Note that the same reference numerals as in FIGS. 1 to 3 denote the same parts in FIG. 4 and the subsequent drawings, and a detailed description thereof will be omitted.

As shown in FIGS. 1 to 3, a liquid crystal display 1 has a pair of opposing substrates 2 and 3. TFT (Thin Film Transistor) elements 4, pixel electrodes 5, gate lines 9, and signal lines 10 are formed on the inner surface of the first substrate 2. An alignment film 6a is formed on these components.

A color filter (not shown), a black matrix (not shown), and a common electrode 13 are formed on the inner surface of the second substrate 3. An alignment film 6b is formed on the second substrate 3.

Additionally, a liquid crystal material 8, such as a ferroelectric liquid crystal or an anti-ferroelectric liquid crystal, is sandwiched between the TFT elements 4 and the pixel electrodes 5 formed on the first substrate 2 and the common electrode 13 formed on the second substrate 3. This liquid crystal material 8 has spontaneous polarization which is intrinsic or is induced by application of an electric field. A seal 11 is formed in the peripheral portion and spacers 12 are formed in non-pixel portions between the first and second substrates 2 and 3.

Two polarizing plates 7a and 7b having transmission axes shifted 90° are adhered to the outsides of the first and second substrates 2 and 3.

The first substrate 2 will be described below. The structures of the TFT element and each electrode are as follows.

Capacitor lines (not shown) and the gate lines 9 are covered with a gate insulating film (not shown), and a thin semiconductor film (not shown) is formed on this gate insulating film. On this thin semiconductor film, a channel protecting film (not shown) for protecting the thin semiconductor film during channel formation is formed. On the thin semiconductor film and the channel protecting film, source electrodes (not shown) and drain electrodes integrated with the signal line 10 are formed. The source electrodes are electrically connected to source regions of the thin semiconductor film via contact holes. The drain electrodes are electrically connected to drain regions of the thin semiconductor film via contact holes. The source electrodes are also electrically connected to the pixel electrodes 5.

To prevent a short circuit with the common electrode 13, it is also possible to cover the TFT elements 4, the pixel electrodes 5, the gate lines 9, and the signal lines 10 with an insulating film.

The thin semiconductor film can be made from amorphous silicon or polysilicon. A p-SiTFT using polysilicon has high carrier mobility and hence is suited to switching of the liquid crystal material 8 having spontaneous polarization.

TFD (Thin Film Diode) elements can be used instead of TFT elements provided that each pixel can be switched.

The second substrate 3 will be described next.

As shown in FIG. 1, a common electrode using two interdigitated comb electrodes 13a and 13b is formed on the color filter on the second substrate 3. A portion 14 corresponding to the teeth of these comb electrodes is a display area. Therefore, this tooth portion 14 is preferably formed by a transparent conductive film, such as an ITO (Indium Tin Oxide) film, in the case of a transmissive liquid crystal display or a metal film having high reflectance, e.g., an aluminum film, in the case of a reflective liquid crystal display. A peripheral portion 15 connecting these teeth is a non-display area. Note that the color filter can also be formed on the first substrate 2.

When the color filter is formed on the second substrate 3, a planarizing film is formed between this color filter and the common electrodes 13a and 13b. Since this film planarizes the upper surfaces of these common electrodes 13a and 13b, the alignment property of the liquid crystal material 8 improves, and a short circuit hardly occurs between the common electrodes 13a and 13b and the first substrate 2. Materials forming filter colors of red, green, and blue differ from each other in adhesion to the common electrodes 13a and 13b. Therefore, when the common electrodes 13a and 13b on this color filter are formed by wet etching, differences are produced between the etching rates. Consequently, the width of the common electrodes 13a and 13b sometimes changes in accordance with the filter color. The planarizing film can also solve this problem.

The planarizing film is preferably an organic film made from, e.g., acryl, polyimide, nylon, polyamide, polycarbonate, a benzocyclobutene polymer, polyacrylonitride, or polysilane. Of these materials, acryl, a benzocyclobutene polymer, and polyimide are more preferable in respect of cost, flatness, and chemical stability, respectively.

As shown in FIG. 2, the first and second substrates 2 and 3 are so assembled that each of the comb electrodes 13a and 13b opposes a ½ area of the pixel electrode 5. Referring to FIG. 2, each pixel is divided into upper and lower portions, and the width of teeth of the comb electrodes 13a and 13b is about ½ the length in the longitudinal direction of the pixel electrode. Although the comb electrodes 13a and 13b divide each pixel electrode into upper and lower portions in FIG. 2, they can also divide each pixel electrode 5 into left and right portions. Also, a pixel can be divided into any number of portions as long as the area in which the comb electrode 13a faces the pixel electrode 5 is substantially equal to the area in which the comb electrode 13b faces the pixel electrode 5.

Figure 4:
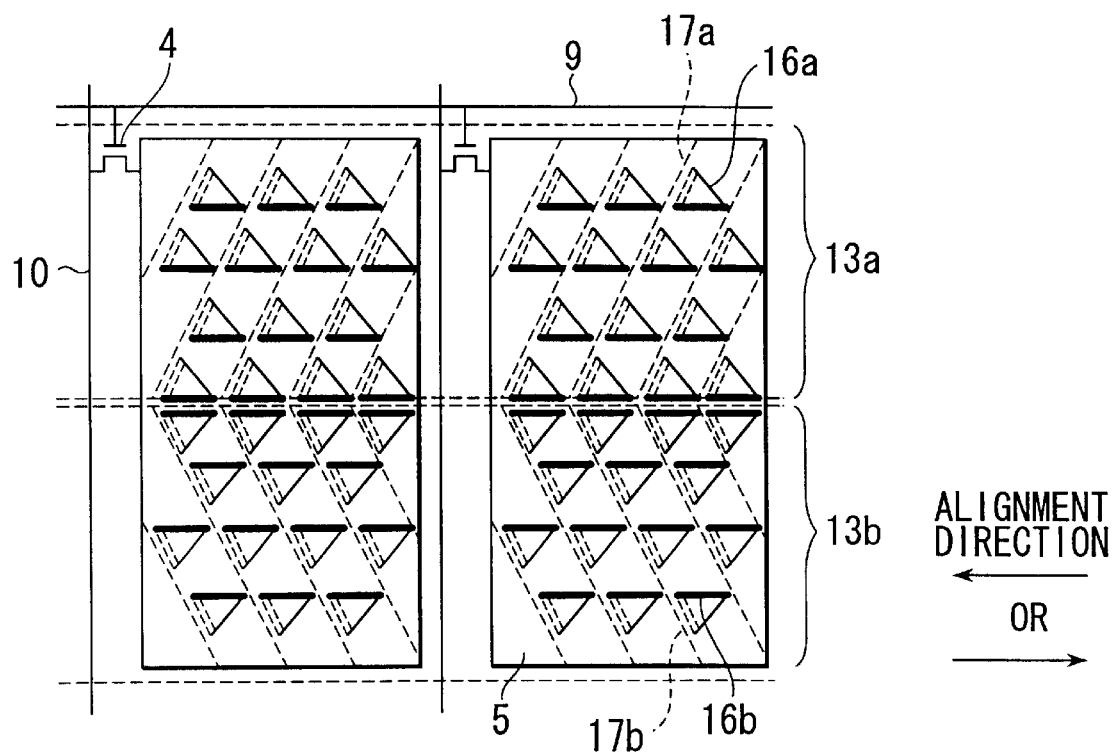
FIG. 4 is a plan view showing the relationship between the electrodes of the liquid crystal display of the present invention and the alignment state of liquid crystal molecules.
Figure 5:
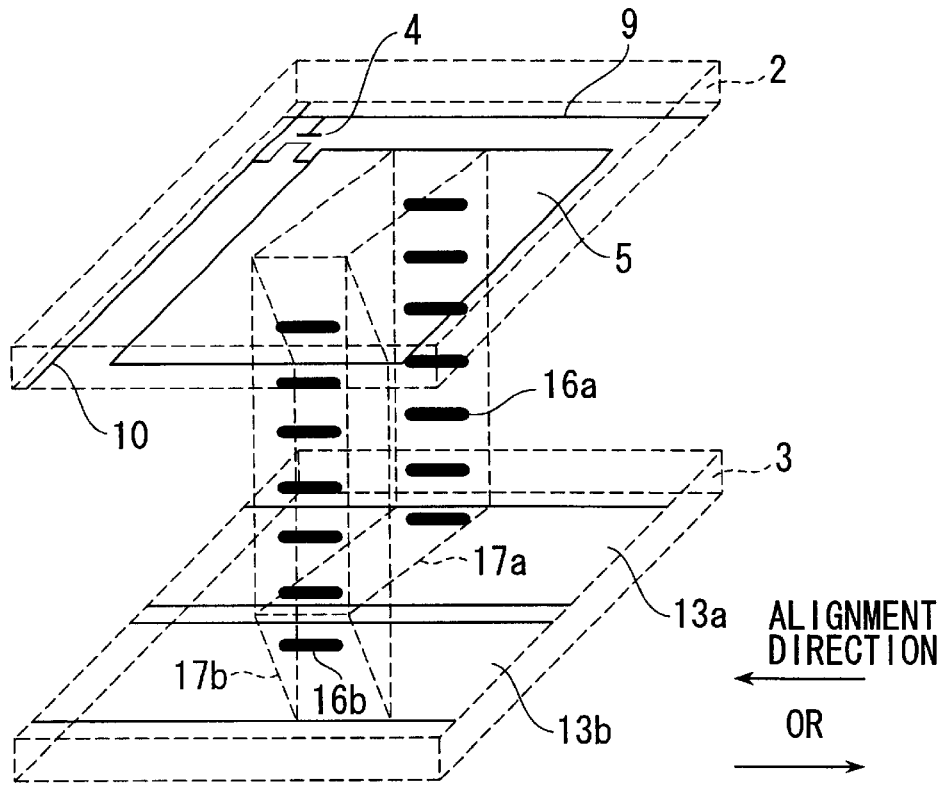
FIG. 5 is a schematic perspective view showing the relationship between the structure of the liquid crystal display of the present invention and the alignment state of liquid crystal molecules.

FIGS. 4 and 5 show the alignment state of the liquid crystal material with no voltage applied in the liquid crystal display of the present invention.

An alignment film is formed on at least one of the first and second substrates, and this alignment film is subjected to an alignment treatment, e.g., subjected to rubbing parallel to the logitudinal direction of teeth of the comb electrodes 13a and 13b. The liquid crystal material is heated to an isotropic phase or a nematic phase and then cooled to transit from the nematic phase to a chiral smectic C phase. During the transition, voltages of opposite polarities are applied to a portion where the comb electrode 13a opposes the pixel electrode 5, i.e., a first region, and a portion where the comb electrode 13b opposes the pixel electrode 5, i.e., a second region.

By forming the chiral smectic C phase in this way, liquid crystal molecules 16a in the first region and liquid crystal molecules 16b in the second region so align themselves that their spontaneous polarization directions are opposite to each other. In the first region, the liquid crystal molecules 16a line up as shown in FIG. 4, and layers 17a sectioned by the dotted lines (virtual lines) seem to be piled up though they are in a plane. Similar layers 17b are also formed in the second region. The smectic layers 17a in the first region and the smectic layers 17b in the second region bend in the boundary between the first and second regions. The angle these two layer directions make is $180°-2\theta$ ($\theta$ is the tilt angle). After the transition to the chiral smectic C phase, the structure of these smectic layers 17 remains unchanged even when the power supply is turned off.

Also, with no voltage applied, the director (the long-axis direction of an average liquid crystal molecule) of the liquid crystal molecule 16a or 16b is substantially parallel to the logitudinal direction of teeth of the comb electrode 13a or 13b.

The reason why liquid crystal molecules align themselves as above will be described below.

Figure 6A:
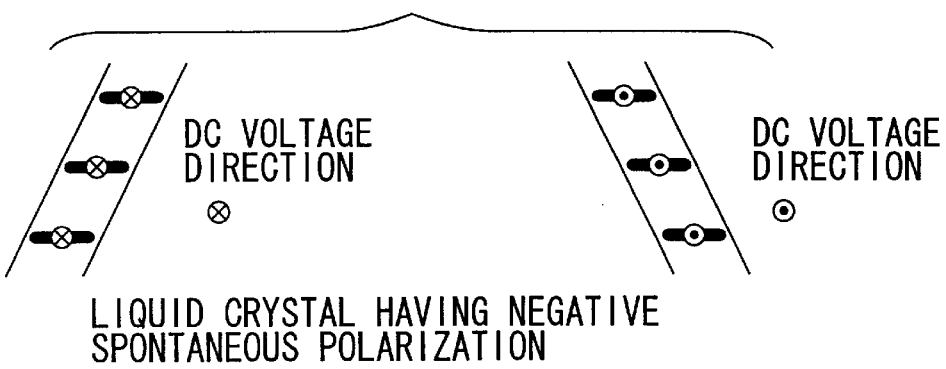
FIG. 6A is a view showing the relationship between the direction of DC voltage and the alignment of liquid crystal molecules during phase transition in a liquid crystal material having negative spontaneous polarization.
Figure 6B:
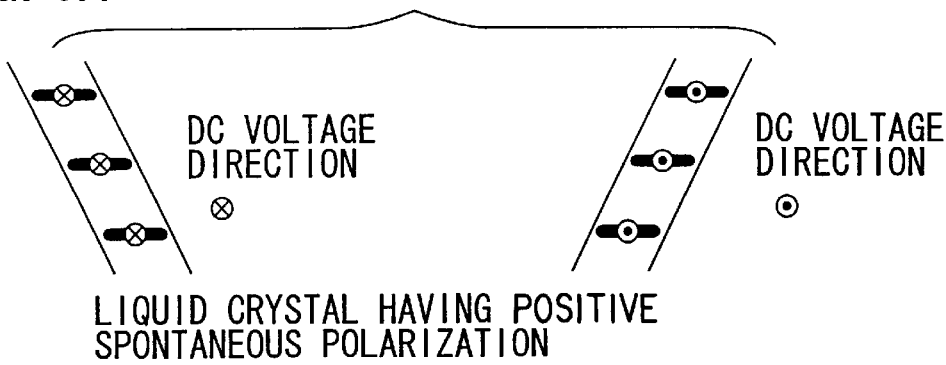
FIG. 6B is a view showing the relationship between the direction of DC voltage and the alignment of liquid crystal molecules during phase transition in a liquid crystal material having positive spontaneous polarization.

As described in J. S. Patel et al., Journal of Applied Physics, 1986, Vol. 59, p.2355, a liquid crystal material having a nematic phase on the high-temperature side of a chiral smectic C phase, i.e., a liquid crystal material having no smectic A phase has orientational order such that liquid crystal molecules align themselves parallel to the alignment direction in a nematic phase. When the liquid crystal cell is cooled in this state, a smectic layer is formed with this alignment presented. The directions of spontaneous polarization are two directions, i.e., directions going out of and into the page. These directions of spontaneous polarization can be regulated in one direction by application of a DC voltage during phase transition to a chiral smectic C phase. FIGS. 6A and 6B show the sign of spontaneous polarization of the liquid crystal material, the polarity of the DC voltage, and the layer structure of the liquid crystal material.

In the present invention, a liquid crystal is aligned by using the above characteristics presented by J. S. Patel et al. However, the present invention is different in that: 1) two regions having different smectic layer directions are formed in one pixel; 2) a common electrode is constituted by a pair of interdigitated comb electrodes so that voltages having opposite polarities can be applied in one pixel; and 3) the logitudinal direction of teeth of the comb electrodes is approximately parallel to the alignment direction of the liquid crystal with no voltage applied.

The effects of 1) to 3) will be explained below.

1) As presented by J. S. Patel et al., when a DC voltage is applied during transition to a chiral smectic C phase, the alignment direction of a liquid crystal material is one of those shown in FIGS. 6A and 6B.

Figures 7A, 7B, 7C:
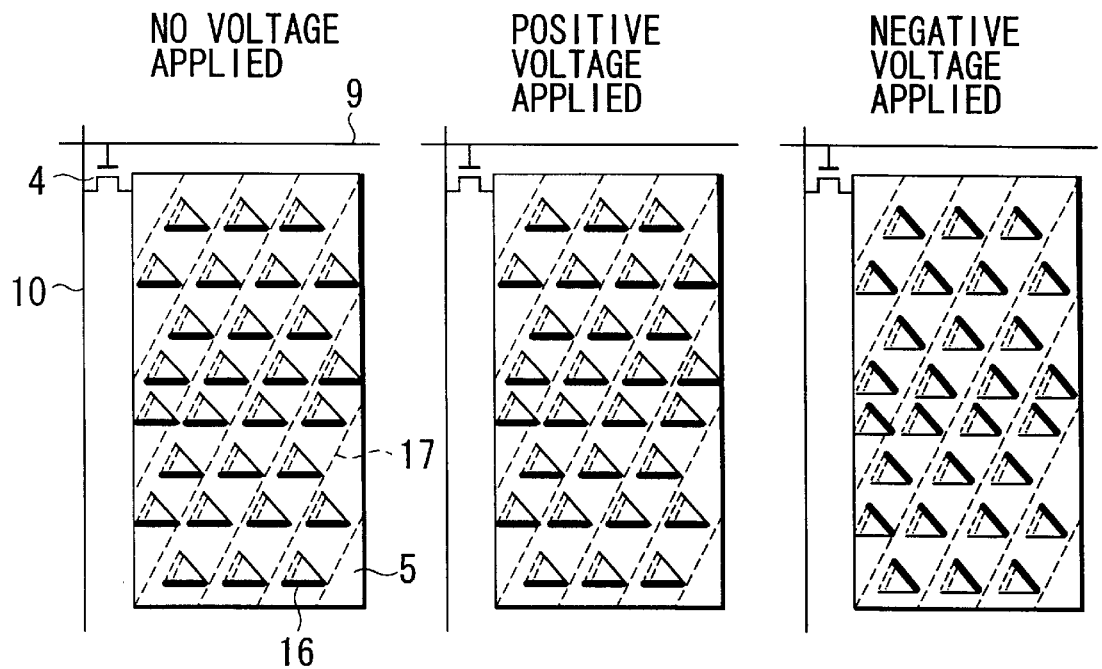
FIGS. 7A to 7C are views showing the relationship between the applied voltage and the direction of a liquid crystal director in a conventional liquid crystal display.

When a chiral smectic C phase is formed by using a liquid crystal material having positive spontaneous polarization and applying a positive voltage upward in the direction going out of the page, liquid crystal molecules align themselves as shown in FIG. 7A. When a liquid crystal cell having this alignment as shown in FIG. 7A is driven by application of voltage, liquid crystal molecules rarely switch, as shown in FIG. 7B, when a positive voltage is applied to a pixel electrode; these liquid crystal molecules switch when a negative voltage is applied to the pixel electrode as shown in FIG. 7C. Accordingly, to display white by using this cell, a negative voltage must be kept applied. Consequently, image sticking occurs owing to an ionic impurity in the liquid crystal material. Also, if the cell is driven with an alternate current in order to prevent image sticking, black is displayed when a positive voltage is applied and white is displayed when a negative voltage is applied, resulting in flickering.

Figures 9A, 9B:
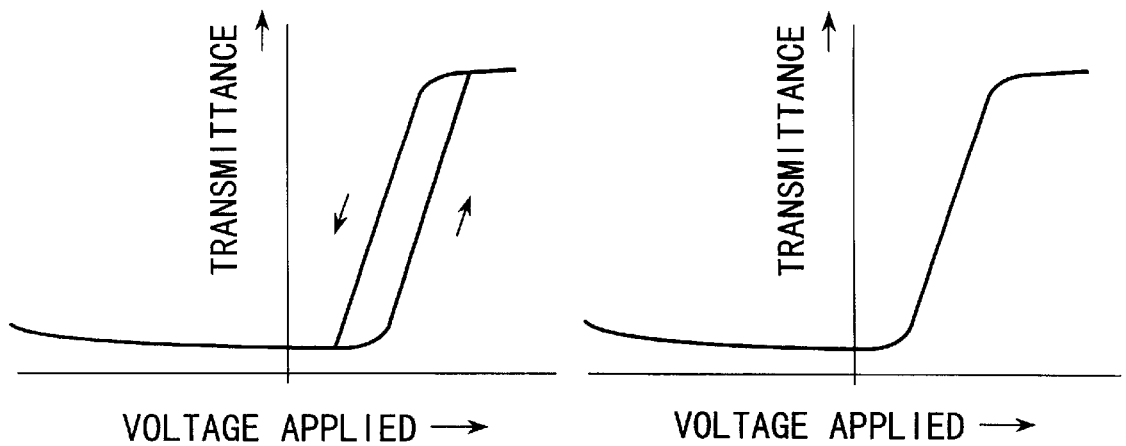
FIG. 9A is a graph showing the applied voltage-transmittance characteristic of the conventional liquid crystal display when domain inversion occurs upon switching.
FIG. 9B is a graph showing the applied voltage-transmittance characteristic of the conventional liquid crystal display when no domain inversion occurs upon switching.

The applied voltage-transmittance characteristics of this cell are as shown in FIGS. 9A and 9B. When a liquid crystal material which causes domain inversion upon switching is used, hysteresis occurs as shown in FIG. 9A. On the other hand, when liquid crystal molecules continuously rotate without any domain inversion upon switching, no hysteresis occurs as shown in FIG. 9B.

Figures 8A, 8B, 8C:
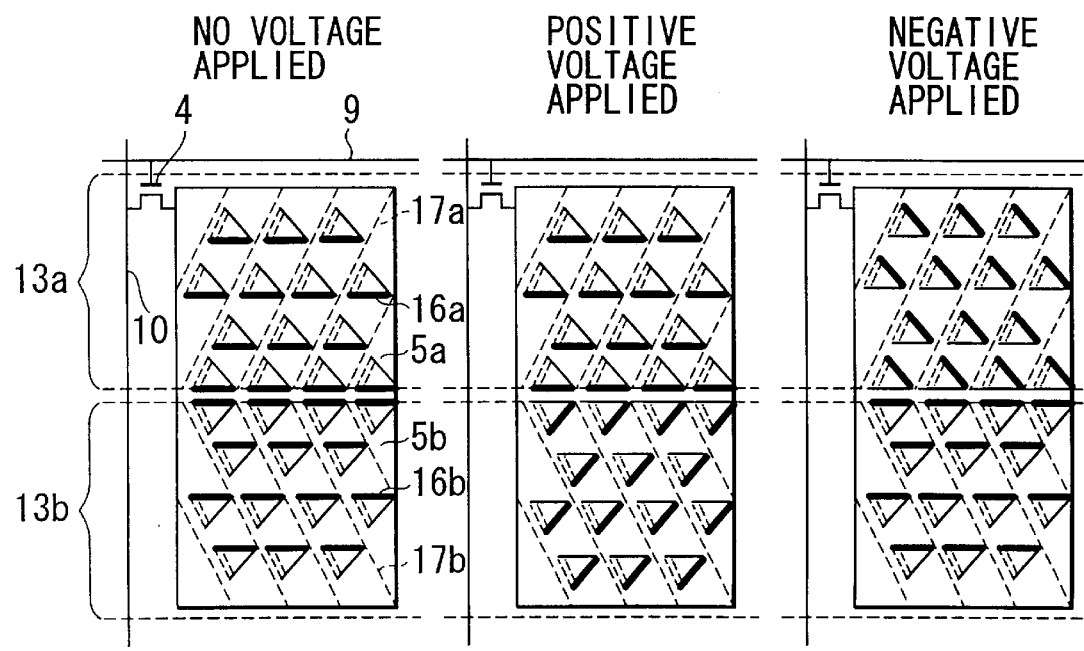
FIGS. 8A to 8C are views showing the relationship between the applied voltage and the direction of a liquid crystal director in the liquid crystal display of the present invention.

FIGS. 8A to 8C show the alignments of liquid crystal molecules when two regions having different smectic layer directions are formed in one pixel as in the present invention.

With no voltage applied, liquid crystal molecules exhibit alignment as shown in FIG. 8A. With positive voltage applied as shown in FIG. 8B, the lower half region in which the comb electrode 13b is formed displays white. With negative voltage applied as shown in FIG. 8C, the upper half region in which the comb electrode 13a is formed displays white. The areas of these upper and lower regions are approximately equal; the volumes of the liquid crystal materials contained in the upper and lower half regions are approximately equal. Therefore, if the absolute values of the positive and negative applied voltages are equal, the luminances are also approximately equal. So, no flicker takes place.

Note that "approximately" means that the area difference and the luminance difference are 5% or less, in which case substantially no flicker occurs.

Figures 10A, 10B:
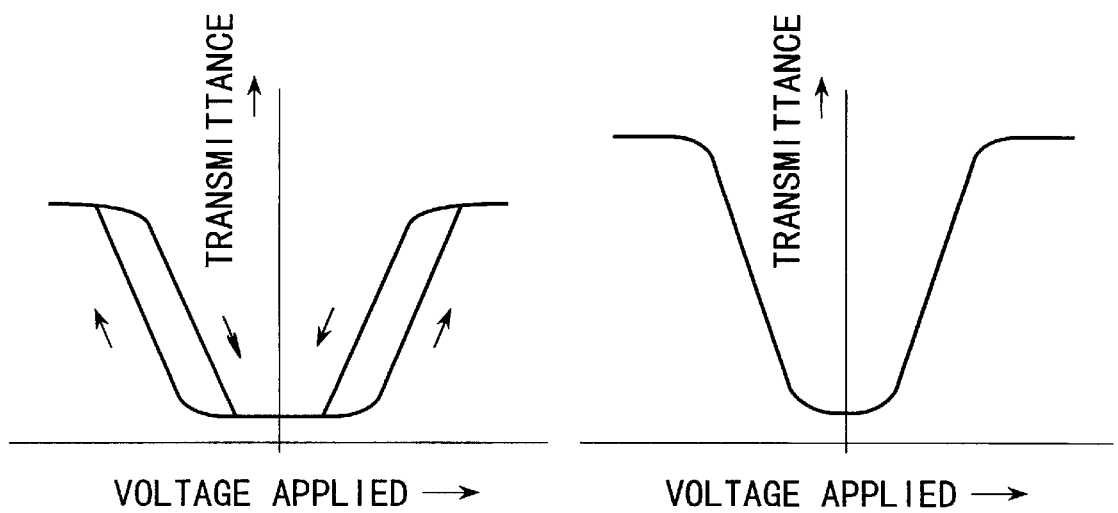
FIG. 10A is a graph showing the applied voltage-transmittance characteristic of the liquid crystal display of the present invention when domain inversion occurs upon switching.
FIG. 10B is a graph showing the applied voltage-transmittance characteristic of the liquid crystal display of the present invention when no domain inversion occurs upon switching.

FIGS. 10A and 10B show the voltage-transmittance characteristics of this cell. As shown in FIGS. 10A and 10B, a gray scale image can be displayed by changing the magnitude of a voltage to be applied to the cell. When a liquid crystal material which causes domain inversion upon switching is used, hysteresis occurs as shown in FIG. 10A.

In this case, a gray scale image is primarily displayed by the ratio of the area of domains inverted by the voltage to the area of domains not inverted. When liquid crystal molecules continuously rotate without any domain inversion upon switching, no hysteresis occurs as shown in FIG. 10B.

In a horizontal chevron structure disclosed in L. Komitov et al., Ferroelectrics, 1996, Vol. 189, p.199, Proceeding in International Ferroelectric Liquid Crystal Conference FLC '97, and APD (Alternating Polarization Domain) by J. Fiinfschilling et al., disclosed in Jpn. Pat. Appln. KOKAI Publication No. 10221718, two regions are spontaneously formed without applying any DC voltage. In these methods, locations where these two regions are formed cannot be controlled. Hence, it is difficult to make the areas of two regions equal to each other in one arbitrary pixel.

2) When two TFT elements and two pixel electrodes are formed in one pixel, DC voltages having opposite polarities can be applied to one pixel. When two TFTs are formed in one pixel, the aperture ratio of the pixel lowers, and this presumably lowers the luminance when white is displayed. To avoid this problem, in the present invention the common electrode is formed by a pair of interdigitated comb electrodes. A common electrode made from ITO or the like can be very easily formed into the shape of a comb by using the PEP method. Note that patterning ITO into stripes is also performed in color STN (Super Twisted Nematic) liquid crystal displays, and the yield is high.

The space portion between the teeth of a pair of comb electrodes is a non-pixel region in which no voltage is applied to a liquid crystal. The width of this space portion can be decreased to 10 μm or less by the PEP method. Consequently, the lowering of the aperture ratio is much smaller than that when two TFT elements are formed in one pixel. Also, the lowering of the aperture ratio can be suppressed by forming a capacitor line in a portion which faces the space portion. Commonly, the width of this capacitor line is 20 to 40 μm, larger than the width of the space portion. In this case, therefore, forming the common electrode into the shape of a comb does not lower the aperture ratio.

The thickness of the comb electrode is preferably 80 to 300 nm. A thickness smaller than 80 nm is unpreferable because the resistance increases. A thickness exceeding 300 nm is also unpreferable because film formation takes long time and multiple reflection causes color tinge when a transparent electrode made of e.g. ITO is adopted.

The width of the peripheral portion of the comb electrode is preferably 0.5 to 10 mm when only ITO is used as the comb electrode. A width smaller than 0.5 mm is unpreferable because the resistance increases. A width larger than 10 mm is also unpreferable because the area of the liquid crystal display increases.

When ITO is used, it is necessary to prevent the influence of delay of signals, since ITO has relatively high resistivity. To this end, the peripheral portion is preferably formed by a metal film having low resistivity, e.g., a film of molybdenum, tungsten, aluminum, chromium, copper, nickel, or tantalum. When this is the case, the width of the peripheral portion can be decreased to less than 0.5 mm.

The term "comb" will be explained below. A comb is usually considered to have a shape as shown in FIG. 1. However, "comb" used in the present invention is not limited to the shape shown in FIG. 1; it includes all shapes having functions equivalent to that shown in FIG. 1.

It is also possible to form a common electrode which is not a comb electrode on the entire surface of the second substrate and form a pixel electrode by two divided sub-pixel electrodes instead. It is further possible to divide a non-comb common electrode into two electrodes for one pixel and also divide a pixel electrode into two sub-pixel electrodes. When this is the case, projections for connecting columnar electrodes are formed on the opposing sides of the two common electrodes and on the opposing sides of the two sub-pixel electrodes. These two common electrodes and two sub-pixel electrodes are connected by the columnar electrodes such that they are cross-connected to electrodes adjacent to the opposing electrodes. Consequently, voltages having different polarities can be applied to a pair of adjacent common and sub-pixel electrodes (this will be described later in the ninth embodiment).

3) The present inventors studied the relationship between the reliability of a liquid crystal display and the alignment direction of liquid crystal molecules. As a consequence, the present inventors have found that the reliability is highest when the logitudinal direction of teeth of the comb electrodes is approximately parallel to the alignment direction of liquid crystal molecules with no voltage applied, which is equal to the alignment direction of an alignment film. The reason will be explained below.

Figures 11A, 11B, 11C:
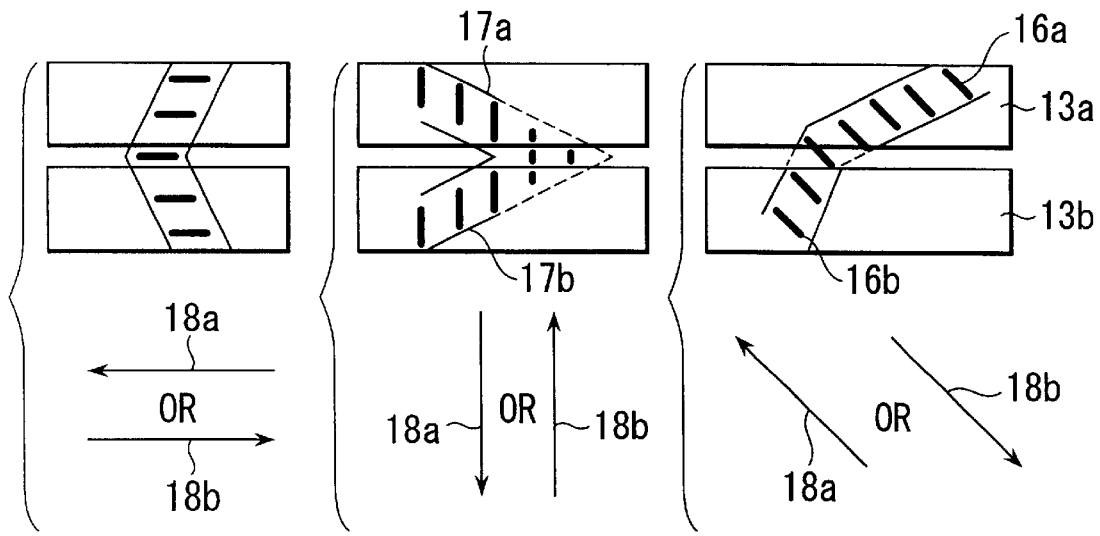
FIGS. 11A to 11C are views showing the relationship between the longitudinal direction of teeth of a comb common electrode and the alignment state of liquid crystal molecules in connection with the direction of alignment.

FIGS. 11A to 11C show liquid crystal molecular alignments when the logitudinal direction of teeth of the comb electrodes 13 is parallel to (FIG. 11A), perpendicular to (FIG. 11B), and forms an angle of 45° with (FIG. 11C) the alignment direction. In FIGS. 11A to 11C, reference numerals 18a and 18b denote alignment directions. Note that the liquid crystal layer formation method in FIGS. 11A to 11C is the same as in FIG. 4. That is, when a liquid crystal transits to a chiral smectic C phase, voltages having opposite polarities are applied to a portion where the common electrode 13a opposes the pixel electrode 5, i.e., the first region, and to a portion where the common electrode 13b opposes the pixel electrode 5, i.e., the second region.

When the directions are parallel as in FIG. 11A, the smectic layer intervals are always equal, so the alignment of liquid crystal molecules is not disturbed in the boundary between the first and second regions, and no light omission takes place. Also, since no strain acts on the liquid crystal molecules in this boundary, this liquid crystal alignment is stable and does not deteriorate even when the liquid crystal display is driven for long time periods.

When the directions are perpendicular as in FIG. 11B, the layer interval of one layer narrows (no constant layer interval can be held) in the boundary. This disturbs the alignment of a liquid crystal and causes an alignment defect. This defect produces a light leak and lowers the contrast. Also, since this defect spreads when the liquid crystal display is driven for long time, the contrast further lowers.

As shown in FIG. 11C, when the logitudinal direction of teeth of the comb electrodes and the alignment direction of a liquid crystal with no voltage applied forms an angle of 45°, the layer space changes in the boundary. Since the alignment of the liquid crystal is disturbed in the boundary, light loss occurs. This alignment defect spreads when the liquid crystal display is driven for long time periods. The smaller the angle the logitudinal direction of teeth of the comb electrodes makes with the alignment direction of the liquid crystal with no voltage applied, the smaller the disturbance of the alignment, i.e., the smaller the lowering of the contrast.

Note that "approximately parallel" includes an error of ±10°, more preferably, ±5°.

The present inventors made extensive studies and have found that the following form is preferable in the present invention.

When two comb electrodes are meshed, i.e., interdigitated, the width of teeth of these comb electrodes can be selected from various values. The width of teeth of the comb electrodes can be maximized when it is made equal to the width of the pixel electrode in the widthwise direction of teeth and the pitch of teeth of the comb electrodes is shifted by an approximately half period from the pitch of the pixel electrodes. As the tooth width increases, the wiring resistance decreases, and blunting of the applied voltage reduces. Also, the comb electrodes can be formed by an easy method such as printing.

Note that an "approximately half period" includes an error of ±5% with respect to one period.

The pitch of teeth of the comb electrodes shown in FIG. 1 is preferably 500 $\mu$m or less. When electric fields having the same polarity are applied to the first and second regions, the liquid crystal alignment, i.e., the light transmittance in the first region is different from that in the second region. If this pitch is larger than 500 $\mu$m, the first and second regions are seen as white and black belts, i.e., stripes. When the pitch is 500 $\mu$m or less, no such problem arises because the human eye sees the first and second regions as a mixture.

When the first region is in a light transmission state, even on the second region light is transmitted from the boundary with the first region. This is due to diffraction of light, and this increases the luminance when white is displayed. As the width of teeth of the comb electrodes decreases, the effect of this diffraction increases. When the pitch of teeth of the comb electrodes is 160 $\mu$m or less, the luminance when white is displayed dramatically increases. Accordingly, the pitch of teeth of the comb electrodes is preferably 160 $\mu$m or less in respect of the diffraction effect.

Furthermore, the width of the space portion between teeth is preferably 10 $\mu$m or less in order to suppress lowering of the operture ratio. However, this width is preferably 2 $\mu$m or more in order to prevent a short circuit between the comb electrodes. Note that in the fifth embodiment to be described later, the distance between sub-pixels is preferably 2 to 10 $\mu$m for the same reason.

Letting p be the chiral pitch of a liquid crystal material and d be the distance between the first and second substrates, d<p is desirable. When d<p, it is possible to prevent liquid crystal molecules from forming a twisted structure. If liquid crystal molecules form a twisted structure, light loss with no voltage applied increases, and this lowers the contrast of the liquid crystal display.

When the tilt angle of a liquid crystal is 22.5°, the angle, which the optical axis of a liquid crystal makes with the transmission axis of a polarizing plate when the direction of spontaneous polarization is inverted by voltage application, is 45°, and the transmittance is a maximum. Accordingly, to obtain a liquid crystal display having high contrast, it is desirable that the tilt angle of the liquid crystal be approximately 22.5°.

Note that "approximately 22.5°" includes an error of ±5°.

When the transmittance is taken into consideration, the tolerance of the tilt angle is 12.5 to 32.5°. Therefore, the angle 180°−2θ (θ is the tilt angle), which the directions of smectic layers in the first and second regions make, is preferably 115 to 155°. Since the transmittance is represented by $\sin^2(4\theta)$, the transmittance is about 59% when the tilt angle is 12.5° However, if the tilt angle is 10°, the transmittance lowers to about 41%, so no practical element can be obtained.

As the liquid crystal material having a nematic phase on the high-temperature side of a chiral smectic C phase according to the present invention, it is possible to use, e.g., a (+)-4-n-octyloxyphenyl-4-(2"-methylbutyl)biphenyl)-4'-carboxylate or diphenylpyrimidine-based liquid crystal.

Examples of the alignment film material used in the liquid crystal display of the present invention are organic films of, e.g., acryl, polyimide, nylon, polyamide, polycarbonate, a benzocyclobutene polymer, polyacrylnitrile, and polysilane, and obliquely-vapor-deposited silicon oxide. In particular, polyimide, polyacrylnitrile, and nylon are superior in the ease of film formation and the chemical stability.

When polyimide is used as the alignment film, the use of polyimide having relatively low polarity, in other words, relatively strong hydrophobic nature is preferable. When this relatively low polarity is represented by a physical value, a polarity force component γp of the surface energy is 9 dyn/cm or less.

Examples of this relatively-low-polarity polyimide are polyimide having an imidization ratio of 85% or more, polyimide containing fluorine atoms ($CF_3$ groups), polyimide having a benzene ring in an acid anhydride of polyimide precursor, polyimide having no oxygen atom (ether linkage) in diamine of polyimide precursor, and polyimide having a linkage —$CH_2$ in diamine of polyimide precursor.

Relatively-low-polarity polyimide is preferable for the reasons explained below.

When a chiral smectic C phase appears, the electro-clinic effect between liquid crystal molecules and an alignment film produces a force by which the spontaneous polarization of the liquid crystal molecules is directed to the outside or inside of a substrate. Whether the spontaneous polarization is directed to the outside or inside is determined in accordance with whether the alignment film is electron donative or electron attractive. When this force is contrary to the voltage applied between the comb electrodes and the pixel electrode, e.g., when the spontaneous polarization points to the inside by a DC voltage although the spontaneous polarization points to the outside by the electro-clinic effect at the interface of the first substrate, the degree of alignment of the liquid crystal molecules lowers. To prevent this, it is only necessary to decrease the electro-clinic effect. The smaller the polarity of a polyimide alignment film, the smaller the polarity surface interaction with a liquid crystal. Hence, low-polarity polyimide is suited to the liquid crystal display of the present invention.

Additionally, as an alignment film suited to the present invention, alignment film materials and rubbing conditions which give a relatively small pretilt angle of 4° or less to a liquid crystal are preferable. Since the pretilt angle of liquid crystal molecules in a bulk portion decreases, with respect to the rubbing direction of the alignment films on the first and second substrates, parallel is preferred to antiparallel. The smaller the pretilt angle of liquid crystal molecules, the smaller the chevron angle, and the more easily a bookshelf structure is obtained. Consequently, an alignment defective region such as a zigzag defect reduces to achieve good alignment.

A method of manufacturing the liquid crystal display of the present invention will be described next.

Pixel electrodes, TFT elements, gate lines, signal lines, capacitor lines, and the like are formed on one principal surface of a first substrate, and an alignment film is formed on these components.

A common electrode, a color filter, a black matrix, and the like are formed on one principal surface of a second substrate, and an alignment film is formed on the common electrode. A planarizing film can also be formed between the color filter and the common electrode where necessary. When the common electrode is to be formed as comb electrodes, these comb electrodes can be formed by forming a transparent conductive film by sputtering or the like, forming a resist film pattern by the PEP process, and etching the transparent conductive film by using this pattern as a mask.

After that, the formed alignment film is rubbed if necessary.

A spacer is scattered on the first substrate, and a sealing material is formed on the peripheral portion of the second substrate. These first and second substrates are assembled such that the principal surfaces on which the alignment films are formed oppose each other, thereby completing a cell. A liquid crystal material is injected between the first and second substrates of this cell under heating.

After that, terminals for applying voltages are connected to the peripheral portion of the formed electrodes, and voltages are applied to the cell such that the cell has regions where voltages applied to the liquid crystal material have opposite polarities. While the voltages are applied, the cell is cooled to form smectic layers in the liquid crystal material. Consequently, a region in which a voltage of one polarity is applied becomes a first region, and a region in which a voltage of opposite polarity is applied becomes a second region.

When a pair of comb electrodes are formed, while the potential of a pixel electrode is held at a predetermined potential such as 0 V, a voltage higher than this predetermined potential is applied to one comb electrode, and a voltage lower than the predetermined potential is applied to the other comb electrode.

When the common electrode is formed on the entire surface of the second substrate and each pixel electrode is divided into two sub-pixel electrodes, while the common electrode is held at a predetermined potential, a voltage higher than this predetermined potential is applied to one sub-pixel electrode, and a voltage lower than the predetermined potential is applied to the other sub-pixel electrode.

Furthermore, when the common electrode and each pixel electrode are divided and columnar electrodes are formed, a predetermined voltage is applied to a common electrode opposing one sub-pixel electrode. Consequently, a common electrode connected to this sub-pixel electrode by the columnar electrode is set at the same potential. Accordingly, the polarity of a voltage applied to the liquid crystal on the sub-pixel electrode applied with the predetermined voltage becomes opposite to that of a voltage applied to the liquid crystal material on the other sub-pixel electrode.

The voltage applied to the cell to form the first and second regions is typically a DC voltage or an offset voltage. The magnitude of these voltages is preferably 0.2 to 10 V. If the voltage is less than 0.2 V, the directions of spontaneous polarization are not regulated in one direction. If the voltage exceeds 10 V, when the smectic layers are formed the surfaces of the alignment films sometimes adsorb ionic impurities contained in the liquid crystal to cause image sticking.

Polarizing plates are attached to the outside of the cell, driving circuits such as driver ICs are mounted, and a backlight and the like are attached to complete the liquid crystal display.

Whether both the first and second regions are present in the completed liquid crystal display can be confirmed by examining the cell with a microscope or the like while applying a desired voltage whose frequency is low enough to allow visual check of changes between black and white.

Embodiments of the present invention will be described below with reference to the accompanying drawings.

FIRST EMBODIMENT

Figure 12:
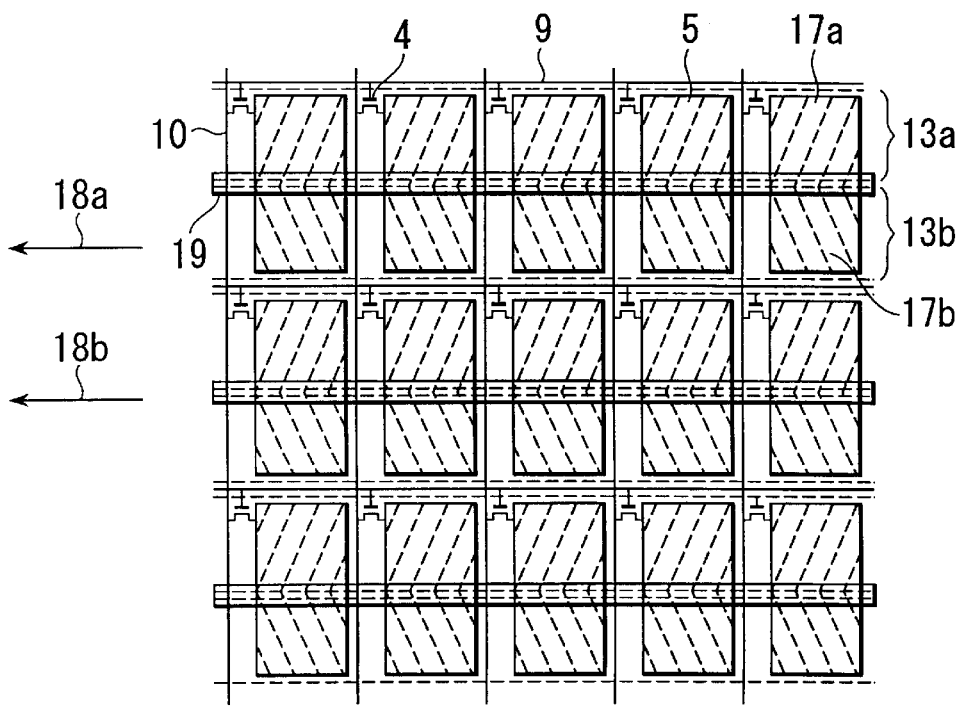
FIG. 12 is a partial plan view showing the arrangement of a liquid crystal display according to the first embodiment of the present invention.

FIG. 12 is a partial plan view of a liquid crystal display according to the first embodiment of the present invention. A sectional view of the liquid crystal display according to this embodiment is the same as FIG. 3, so FIG. 3 will also be referred to. This holds for the fourth to eighth embodiments. The first embodiment will be described below in order of manufacturing steps.

First, TFT elements 4 were formed on a first substrate 2 as follows.

Capacitor lines 19 using chromium and gate lines 9 were formed on a glass substrate as the first substrate 2. These capacitor lines 19 and gate lines 9 were covered with an insulating film (not shown) having a stacked structure of a chromium oxide film and a silicon oxide film. On this insulating film, a thin patterned semiconductor film (not shown) made from amorphous silicon was formed. On this thin semiconductor film, a channel protecting film (not shown) made from silicon nitride was formed. Contact holes (not shown) were formed in these thin semiconductor film and channel protecting film. Source electrodes (not shown) and drain electrodes, which were integrated with signal lines 10, to be electrically connected to source and drain portions, respectively, of the thin semiconductor film via the contact holes were formed. In addition, pixel electrodes 5 electrically connected to the source electrodes were formed. Consequently, the TFT elements 4, the pixel electrodes 5, the gate lines 9, and the signal lines 10 were formed on the first substrate 2.

To prevent a short circuit with common electrodes 13a and 13b formed on a second substrate (to be described later), the TFT elements 4, the pixel electrodes 5, the gate lines 9, and the signal lines 10 were covered with a 100-nm thick silicon oxide film.

Next, a color filter (not shown) and a common electrode 13 were formed on a second substrate 3 as follows.

A chromium film was formed on a glass substrate as the second substrate 3 and patterned to form a black matrix (not shown). On this black matrix, a photosensitive acrylic resin pattern (not shown) into which red, green, and blue pigments were mixed was formed. Additionally, the pattern was coated with a transparent acrylic resin as a planarizing film.

An ITO transparent conductive film was formed on this planarizing film. A positive resist pattern was formed on the ITO film by the PEP process. The ITO film was patterned into the forms of combs by wet etching, thereby forming the comb electrodes 13a and 13b.

After that, the positive resist was removed. The width of teeth of the comb common electrodes 13a and 13b was 145 μm. The width of the space portion between the teeth of the comb common electrode 13a and those of the comb common electrode 13b was 5 μm.

The first substrate 2 on which the TFT elements 4 were formed and the second substrate 3 on which the color filter was formed were cleaned and coated with a polyimide solution (SE-5291 manufactured by Nissan Chemical Industries Ltd., γp: 6 dyn/cm). The resultant structure was heated at 90° C. for 1 min and then at 180° C. for 10 min by using a hot plate, forming alignment films 6a and 6b.

These alignment films 6a and 6b were rubbed by using cotton cloth. A rubbing direction 18a of the first substrate 2 was parallel to the gate lines 9. A rubbing direction 18b of the second substrate 3 was parallel to the logitudinal direction of teeth of the comb common electrodes 13a and 13b. As the rubbing cloth, cotton cloth whose fiber tip diameter was 0.1 to 10 μm was used. The rubbing conditions were a rubbing roller rotating speed of 500 rpm, a substrate moving velocity of 20 mm/s, a depth of the deformed portion of the rubbing cloth of 0.7 mm, and the number of rubbing times of 1.

After the rubbing, the alignment films 6a and 6b were cleaned with an aqueous solution consisting primarily of a neutral surfactant to remove contaminants sticking to the alignment films 6a and 6b from the rubbing cloth.

Next, silicon oxide ($SiO_2$) spacer particles 12 having a diameter of 2.0 μm were scattered on the alignment film 6a of the first substrate 2. A sealing material 11 made from an epoxy resin was printed on the peripheral portion of the second substrate 3 using a dispenser.

The first and second substrates 2 and 3 obtained in this way were opposed to each other with their surfaces having the alignment films 6a and 6b formed thereon facing inside. As shown in FIG. 12, the first and second substrates 2 and 3 were aligned such that the logitudinal direction of teeth of the comb common electrodes 13a and 13b was parallel to the gate lines, and that the area of a portion where the comb electrode 13a opposed the pixel electrode 5 was equal to the area of a portion where the comb electrode 13b opposed the pixel electrode 5. The sealing material 11 was cured by heating under pressure to form a liquid crystal cell. Note that the rubbing directions of the first and second substrates 2 and 3 were parallel to each other. Note also that the capacitor lines 19 were so formed as to oppose the space portions between the teeth of the comb common electrodes 13a and 13b.

After the cell was placed in a vacuum chamber and evacuated, a ferroelectric liquid crystal material 8 phase sequence: solid phase →−30° C.→chiral smectic C (phase→80° C.→nematic phase→85° C.→isotropic phase, tilt angle: 22.5°, spontaneous polarization: 7 nC/cm²) was injected from an injection port. During the injection, the cell and the liquid crystal material were heated to 100° C. After that, the injection port was sealed with an epoxy-based adhesive.

Terminals for applying voltages were connected via an anisotropic conductive film to the peripheral portion of the gate lines 9, the signal lines 10, the capacitor lines 19, and the comb common electrodes 13a and 13b of the cell into which the liquid crystal material 8 was injected. This cell was heated to 90° C. in an oven. +25 V were applied to the gate lines 9 to set the gates of the TFT elements 4 in a normally ON state, and 0 V was applied to the signal lines 10 to hold the pixel electrodes 5 at 0 V. 0 V was also applied to the capacitor lines 19. DC voltages of +1 and −1 V were applied to the comb common electrodes 13a and 13b, respectively. With these voltages kept applied, the cell was cooled from 90° C. to 25° C. at a rate of 10° C./min to form smectic layers 17.

When this cell was observed with a polarizing microscope, the extinction position revealed that the smectic layers 17 in first and second regions as the upper and lower halves, respectively, of each pixel electrode 5 were as shown in FIG. 12. The angle the directions of the smectic layers in these first and second regions formed was 135°.

The gap of this cell was measured and found to be 2.0 μm. The chiral pitch of the liquid crystal used in this embodiment was 4.0 μm, longer than the cell gap. Accordingly, the liquid crystal did not have a helical structure.

A pair of polarizing plates 7 were adhered to the outside of this cell. Note that the transmission axis of one polarizing plate 7 was parallel to the rubbing direction and the transmission axis of the other polarizing plate 7 was perpendicular to the rubbing direction. Driving circuits such as driver ICs were mounted on the cell to which these polarizing plates 7 were adhered, and a backlight and the like were attached to the cell, thereby completing a liquid crystal display 1 of the present invention. To display images on this liquid crystal display 1, the two comb common electrodes 13a and 13b were given the same potential to be used as one common electrode.

Even when the center of the substrate of this liquid crystal display was pushed with a force of 3 kg/cm², no inferior display caused by alignment destruction was found. Additionally, the viewing angle defined under a condition that no tone reversal occurs and a contrast of 10:1 or more is obtained, was 70° or more in the vertical and horizontal directions. The frontal contrast was 200:1. Neither alignment deterioration nor contrast lowering occurred even after a driving test was conducted at 50° for 1,000 hours.

SECOND EMBODIMENT

Figure 13:
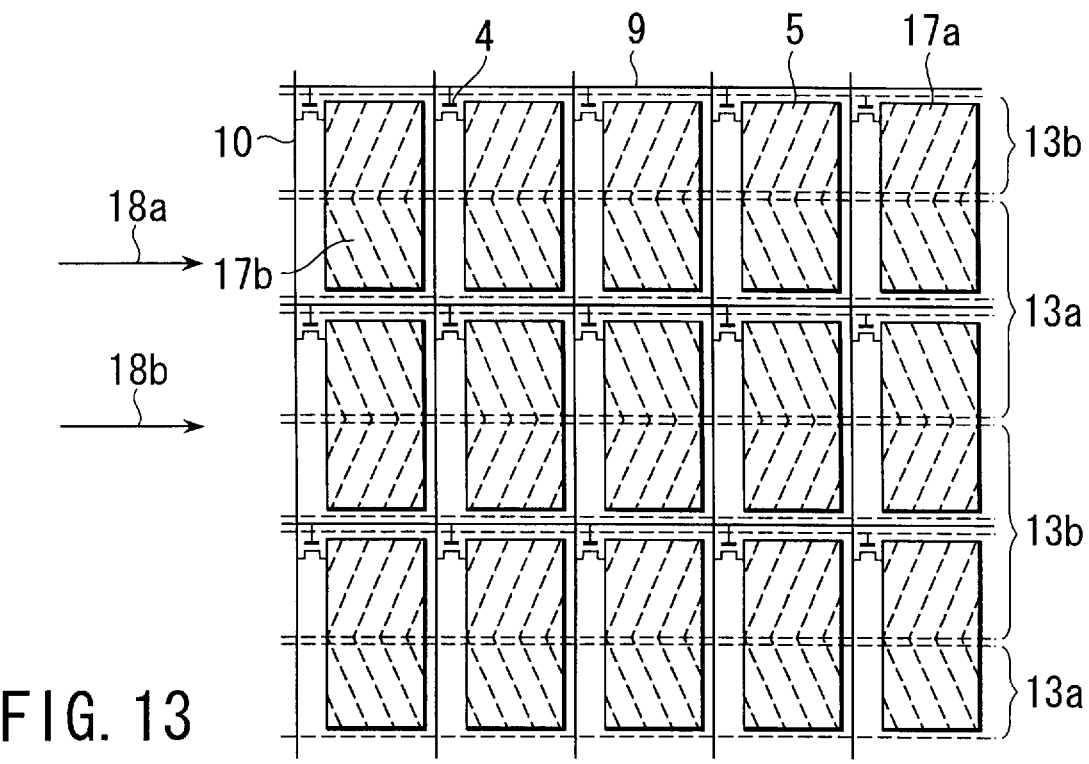
FIG. 13 is a partial plan view showing the arrangement of a liquid crystal display according to the second embodiment of the present invention.

FIG. 13 is a partial plan view of a liquid crystal display according to the second embodiment of the present invention. In FIG. 13, capacitor lines are omitted.

This second embodiment differs from the liquid crystal display of the first embodiment in that the width of teeth of comb common electrodes 13a and 13b was 290 μm, the width of the space portion between the teeth of the comb electrode 13a and those of the comb electrode 13b was 10 μm, the width of teeth of the comb electrodes 13a and 13b was approximately equal to the width of a pixel electrode 5, the pitch of teeth of the comb electrodes 13a and 13b and the pitch of pixel electrodes 5 were shifted a half period, and rubbing directions 18 were reversed.

In the second embodiment, effects similar to those of the liquid crystal display of the first embodiment could be obtained.

THIRD EMBODIMENT

Figure 14:
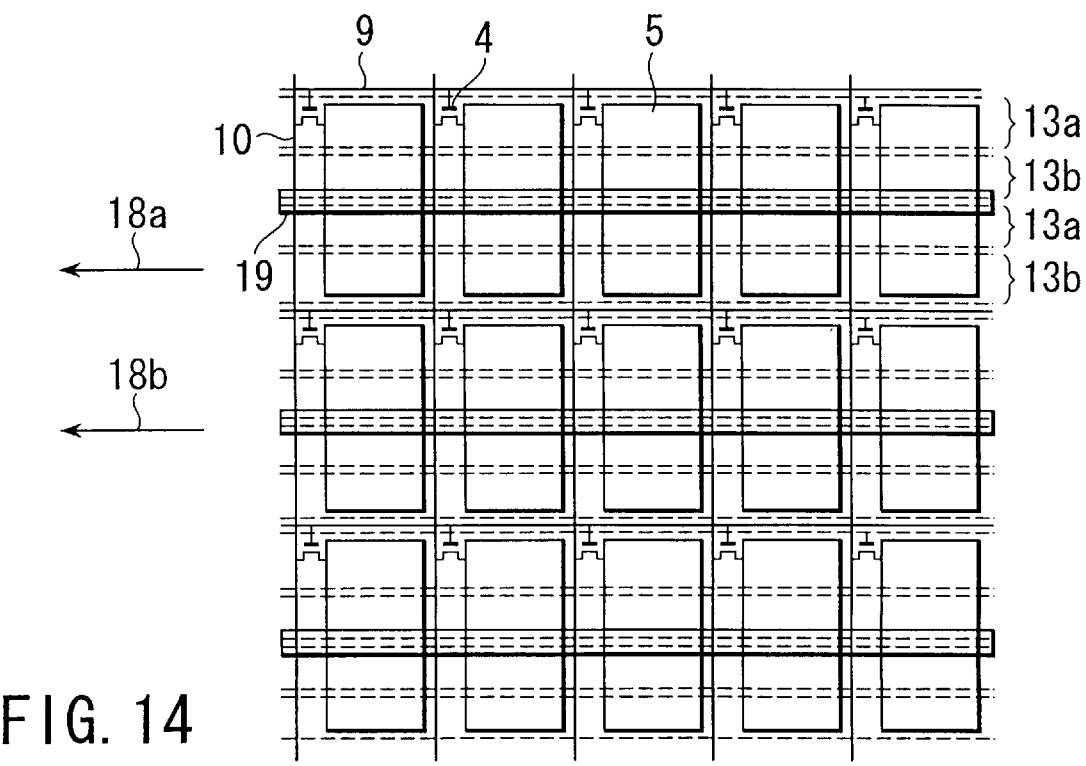
FIG. 14 is a partial plan view showing the arrangement of a liquid crystal display according to the third embodiment of the present invention.

FIG. 14 is a partial plan view of a liquid crystal display according to the third embodiment of the present invention. In FIG. 14, smectic layers 17 are omitted.

This third embodiment differs from the liquid crystal display of the first embodiment in that the width of teeth of comb common electrodes 13a and 13b was 70 μm, and the width of the space portion between the teeth of the comb electrode 13a and those of the comb electrode 13b was 5 μm.

Since the pitch of teeth of the comb common electrodes 13a and 13b was 150 μm, the luminance when white was displayed increased, and the contrast was 300:1. The rest of the performance was identical with the first embodiment.

FOURTH EMBODIMENT

Figure 15:
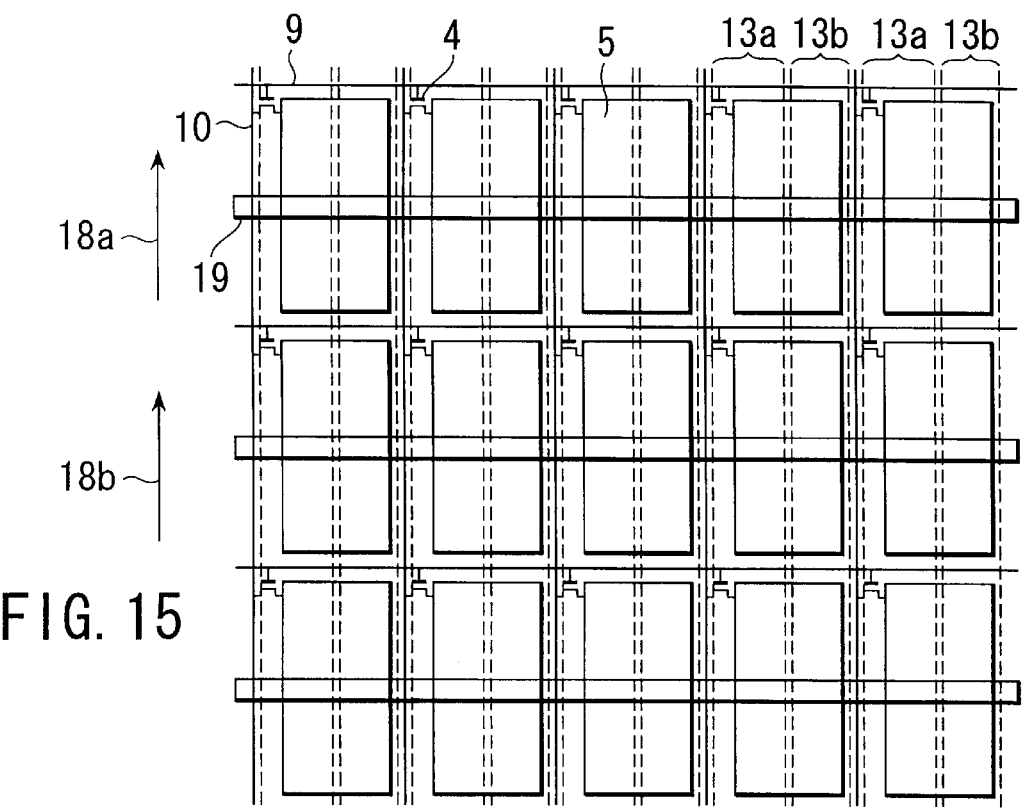
FIG. 15 is a partial plan view showing the arrangement of a liquid crystal display according to the fourth embodiment of the present invention.

FIG. 15 is a partial plan view of a liquid crystal display according to the second embodiment of the present invention. In FIG. 15, smectic layers 17 are omitted.

This fourth embodiment differs from the liquid crystal display of the first embodiment in that the longitudinal direction of teeth of comb common electrodes 13a and 13b was parallel to signal lines 1, the width of teeth of the comb common electrodes 13a and 13b was 45 μm, the width of the space portion between the teeth of the comb electrode 13a and those of the comb electrode 13b was 5 μm, and rubbing directions 18 were parallel to signal lines 10.

Since the pitch of teeth of the comb electrodes 13a and 13b was 100 μm, the luminance when white was displayed increased, and the contrast was 350:1. The rest of the performance was identical with the first embodiment.

FIFTH EMBODIMENT

Figure 16A:
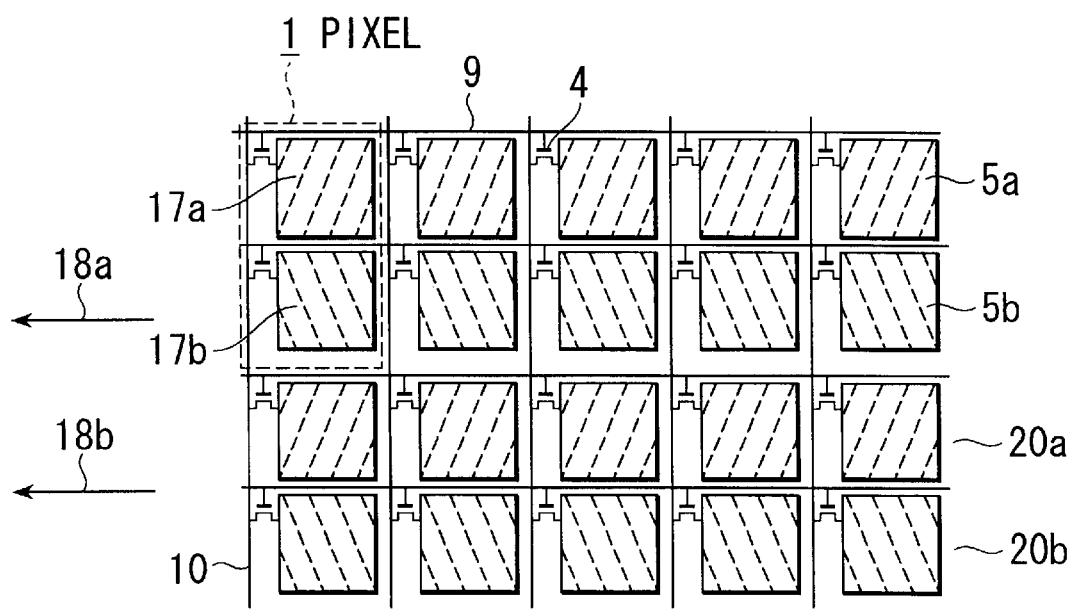
FIG. 16A is a partial plan view showing the arrangement of a liquid crystal display according to the fifth embodiment of the present invention.

FIG. 16A is a partial plan view of a liquid crystal display according to the fifth embodiment of the present invention. In FIG. 16A, a common electrode is omitted.

This fifth embodiment differs from the liquid crystal display of the first embodiment in that a common electrode which was not comb electrodes was formed on the entire surface of a substrate, one pixel was composed of two sub-pixels 20a and 20b, and TFT elements 4 and pixel electrodes 5a and 5b were formed for these sub-pixels 20a and 20b, respectively. A portion where the sub-pixel 20a faced the common electrode was a first region, and a portion where the sub-pixel 20b faced the common electrode was a second region. The pixel pitch was 300 μm.

Figure 16B:
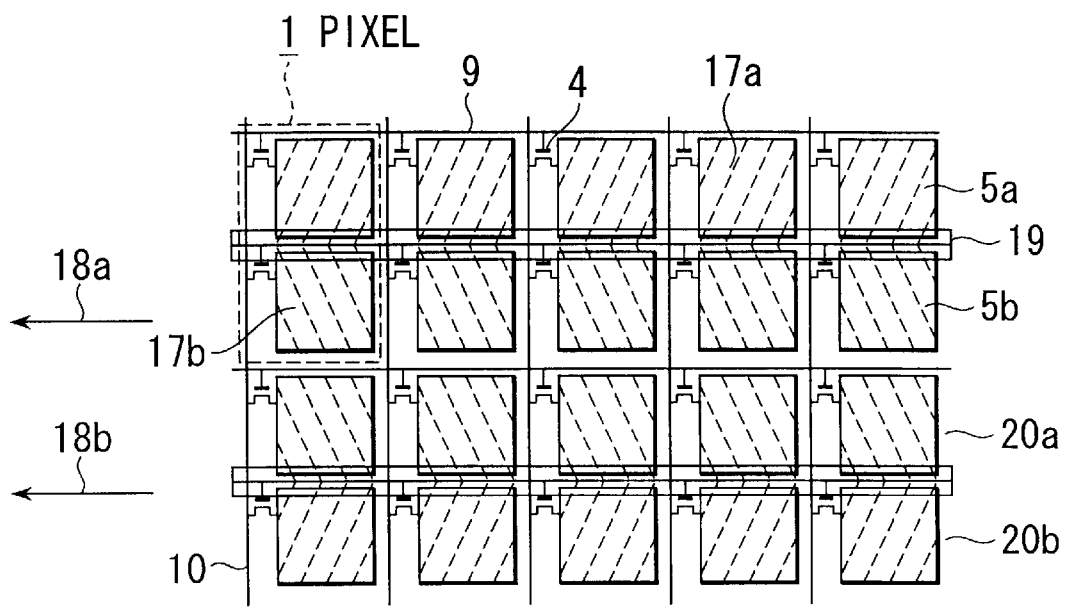
FIGS. 16B to 16D are partial plan views showing the arrangements of liquid crystal displays according to modifications of the fifth embodiment.
Figure 16C:
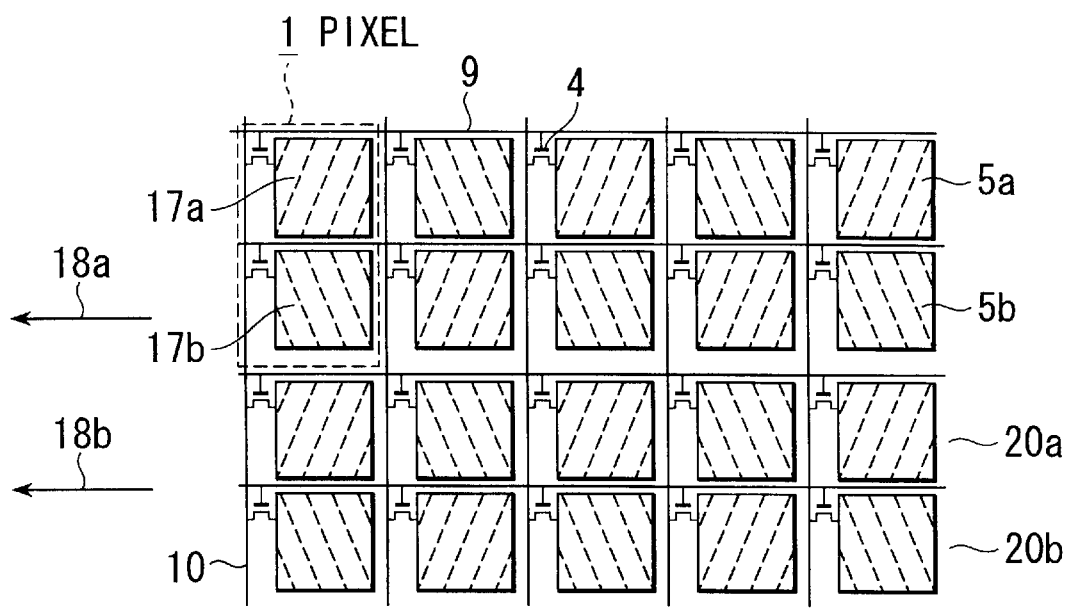
Figure 16D:
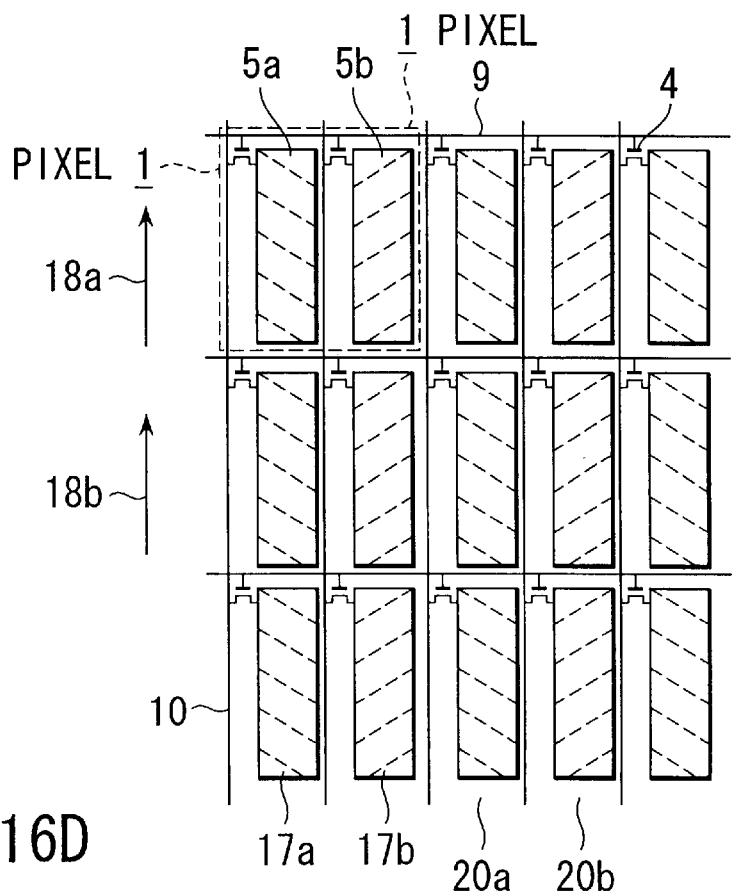

Division of sub-pixels can also be performed as shown in FIGS. 16B to 16D as well as in FIG. 16A. Referring to FIG. 16B, capacitor lines are added to FIG. 16A. Referring to FIG. 16C, although the sub-pixel electrode division method is the same as in FIGS. 16A and 16B, smectic C phases 17a and 17b are formed into a checkerboard pattern. Referring to FIG. 16D, each pixel electrode is divided into right and left sub-pixel electrodes. In these examples, the direction of a dividing line which divides one pixel into first and second regions is preferably approximately parallel to the alignment direction of a liquid crystal with no voltage applied.

Smectic layers were formed as follows. A cell was manufactured following the same procedures as in the first embodiment, and a liquid crystal material 8 was injected. The resultant cell was heated to 90° C. in an oven. −1 V was applied to a sub-pixel 20a. +1 V was applied to a sub-pixel 20b. 0 V was applied to the common electrode. While these voltages were kept applied, the cell was cooled from 90° C. to 25° C. at a rate of 10° C./min to form smectic layers 17.

Following the same procedures as in the first embodiment, polarizing plates 7, driving circuits, a back light, and the like were attached to the cell to complete a liquid crystal display 1.

This liquid crystal display 1 can be driven by two methods. One method is to apply the same potential to the sub-pixel electrodes 5a and 5b of the two sub-pixels 20a and 20b to drive them as one pixel. The other method is to display an image by applying 0 V or a negative voltage to each sub-pixel to which +1 V was applied during the formation of the smectic layers, and display an image by applying 0 V or a positive voltage to each sub-pixel to which −1 V was applied during the formation of the smectic layers. In this method, it is possible to cause the first and second regions to display white at the same time.

When this liquid crystal display was driven by the latter method, the luminance when white was displayed increased to 1.25 times that of the first embodiment, and the contrast was 250:1. When the display was driven by the former method, the contrast was 150:1. Also, in this embodiment, it was unnecessary to pattern the common electrode into the shapes of combs, and this simplified the manufacturing steps. The rest of the performance was identical with the first embodiment.

Note that when the liquid crystal display is driven by the latter method, if white is continuously displayed a direct current is applied to the liquid crystal material 8, and this may cause image sticking by adsorption of an ionic impurity.

To prevent this, the following driving need only be performed.

Figure 17A:
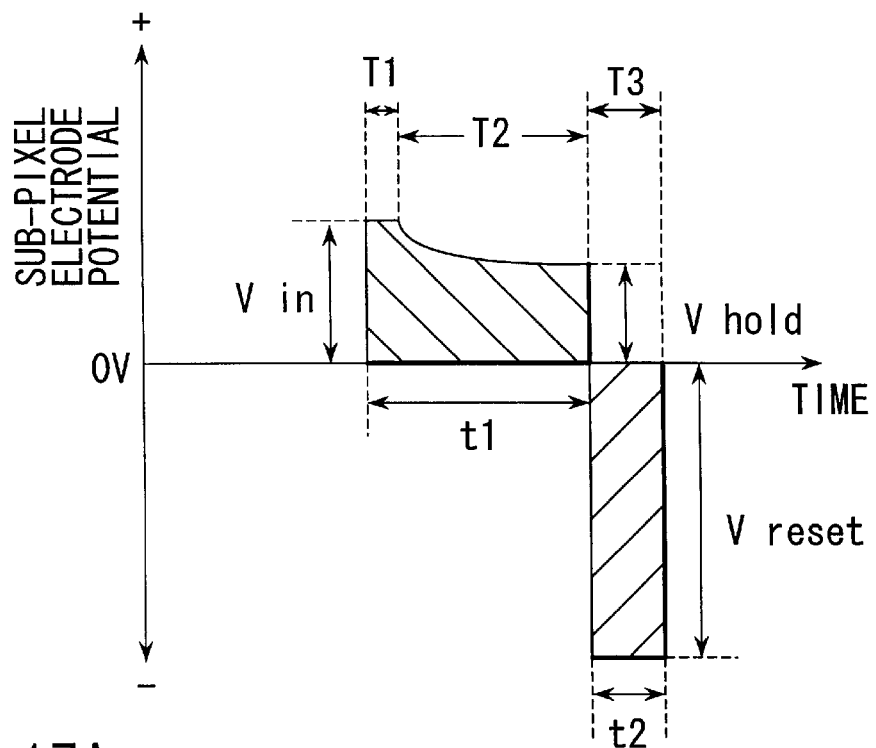
FIG. 17A is a graph showing the relationship between the potential of a sub-pixel electrode and time in the fifth embodiment.

FIG. 17A shows the relationship between the potential of the sub-pixel electrodes 5a and time. Referring to FIG. 17A, the abscissa indicates time, and the ordinate indicates the potential of one sub-pixel electrode. Note that at the same time the potentials of the sub-pixel electrodes 5a and 5b have opposite polarities.

In a write period indicated by T1, the potential of one sub-pixel is a write voltage Vin corresponding to a displayed image. In a hold period indicated by T2, the potential slightly lowers to a holding voltage Vhold owing to the inversion of spontaneous polarization and/or the movement of ions. In a reset period indicated by T3, the potential changes to a reset voltage Vreset having polarity opposite to that in T1 and T2. T1 to T3 shown in FIG. 17A make up one frame.

Letting t1 be T1+T2 and t2 be T3, Vreset is so set as to satisfy $|Vhold \times t1| \leq |Vreset \times t2| \leq |Vin \times t1|$. Consequently, the charge amounts in the two hatched portions t1 and t2 become substantially equal to each other, and this can prevent image sticking.

The voltage-transmittance characteristic of one sub-pixel exhibits the shape as shown in FIG. 9A or 9B, so black is displayed in the period t2. Therefore, an image is impulse display as in the case of a CRT, so high-speed image display is possible. When the ratio of t1 to t2 was 4:1, the contrast was 200:1.

Figure 17B:
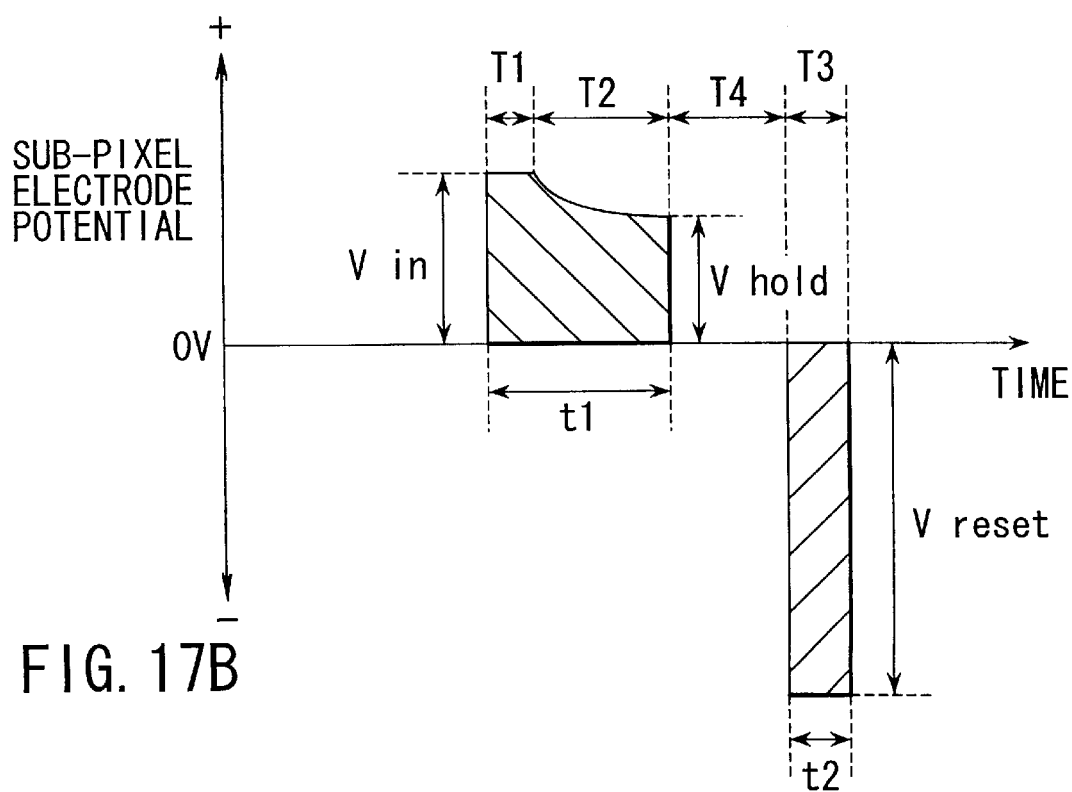
FIG. 17B shows a modification of FIG. 17A.

When the voltage Vreset is large as shown in FIG. 17B, 0 V is preferably applied immediately before the application of this reset voltage (a period T4 in FIG. 17B). In this case, Vreset is also so set as to satisfy $|Vhold \times t1| \leq |Vreset \times t2| \leq |Vin \times t1|$. Consequently, image sticking can be prevented. 0 V is applied during the period T4 for the following reason.

As shown in FIGS. 9A and 9B, when an electric field having the same polarity as the electric field applied during the formation of a chiral smectic C phase is applied, transmittance changes are extremely small. However, as this electric field increases, the transmittance gradually increases. If Vreset is large, the transmittance during the periode T3 increases to degrade the quality of impulse-type display. As a consequence, high-speed motion images leave a trail. To prevent this phenomenon, 0 V is applied in the period T4 to display perfect black, thereby achieving good motion image display. Note that if the period T4 is too long, the white luminance lowers. Hence, the period T4 is preferably 4 ms or less.

SIXTH EMBODIMENT

Figure 18:
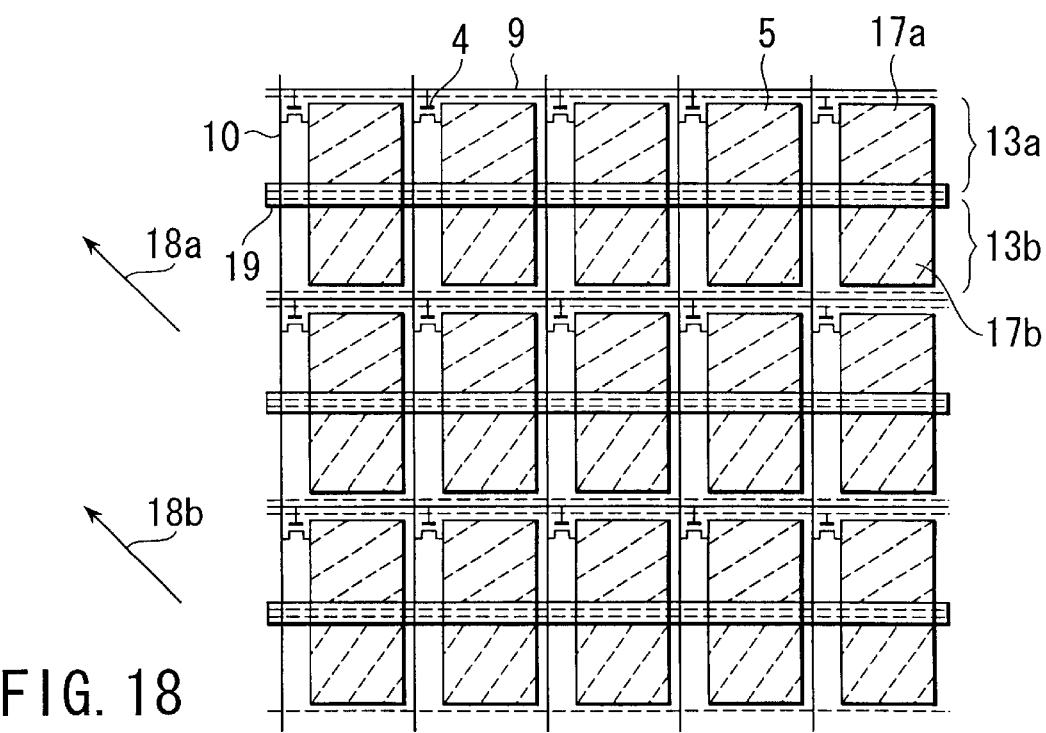
FIG. 18 is a partial plan view showing the arrangement of a liquid crystal display according to the sixth embodiment of the present invention.

FIG. 18 is a partial plan view of a liquid crystal display according to the sixth embodiment of the present invention.

This sixth embodiment differs from the liquid crystal display of the first embodiment in that rubbing directions 18 were inclined 45° with respect to gate lines 9. Since the rubbing directions 18 were thus inclined 45° with respect to the gate lines 9, in the boundary between comb electrodes 13a and 13b, the layer interval between smectic layers 17 was no longer constant, and the alignment of a liquid crystal material 8 was disturbed. Although most of the region where the alignment was disturbed was covered with capacitor lines 19, light leaked from portions not covered with these capacitor lines 19. Consequently, the luminance when black was displayed increased, and the contrast was 150:1. However, the rest of the performance was identical with the first embodiment.

SEVENTH EMBODIMENT

In the first embodiment, polyimide alignment films are rubbed. In this seventh embodiment, the alignment direction of liquid crystal molecules in a nematic phase is determined by forming stripe patterns. The rest is the same as the first embodiment.

A method of forming stripe patterns will be described below.

A first substrate on which TFT elements were formed and a second substrate on which a color filter F. was formed were spin-coated with photosensitive polyimide (PROVIMIDE 408 available from Fuji-Hunt Electronics Technology Co., ltd.) The resultant substrates were heated at 90° C. for 3 min by using a hot plate, exposed through a mask, and developed. Furthermore, these substrates were heated at 220° C. for 30 min in an oven. Consequently, 0.5-$\mu$m wide stripe patterns were formed.

The director of liquid crystal molecules was aligned substantially parallel to this stripe. That is, the alignment direction can be said to be equal to the stripe direction.

A good alignment where the pretilt angle of liquid crystal molecules was 0° on the stripe patterns, was obtained. Also, the performance of the liquid crystal display of this embodiment was identical with the first embodiment.

EIGHTH EMBODIMENT

The eighth embodiment differs from the first embodiment in the applied voltages during the formation of smectic layers. That is, after a cell was manufactured following the same procedures as in the first embodiment, this cell was heated to 90° C. in an oven. ±25 V were applied to gate lines to set the gates of TFT elements in a normally ON state. 0 V was applied to signal lines to hold pixel electrodes at 0 V. 0 V was also applied to auxiliary capacitor lines. A 100-kHz AC voltage of ±3 V on which offset +1 V was superposed was applied to a comb common electrode 13a. A 100-kHz AC voltage of ±3 V on which offset −1 V was superposed was applied to a comb common electrode 13b. With these voltages kept applied, the cell was cooled from 90° C. to 25° C. at a rate of 10° C./min to form smectic layers.

The performance of the liquid crystal display of this embodiment was equivalent to that of the first embodiment.

As in this embodiment, good results can be obtained even when AC voltages on which offset voltages are superposed are used instead of DC voltages. However, the frequency of these AC voltages must be 10 kHz, which is higher than the response speed of a liquid crystal molecule, or more. When AC is superposed, it is possible to prevent the surface of alignment film from adsorbing any ionic impurities contained in a liquid crystal during the formation of smectic layers. Accordingly, no image sticking occurred even when an offset voltage of 10 V or more was applied to the cell during the formation of smectic layers.

NINTH EMBODIMENT

Figure 19:
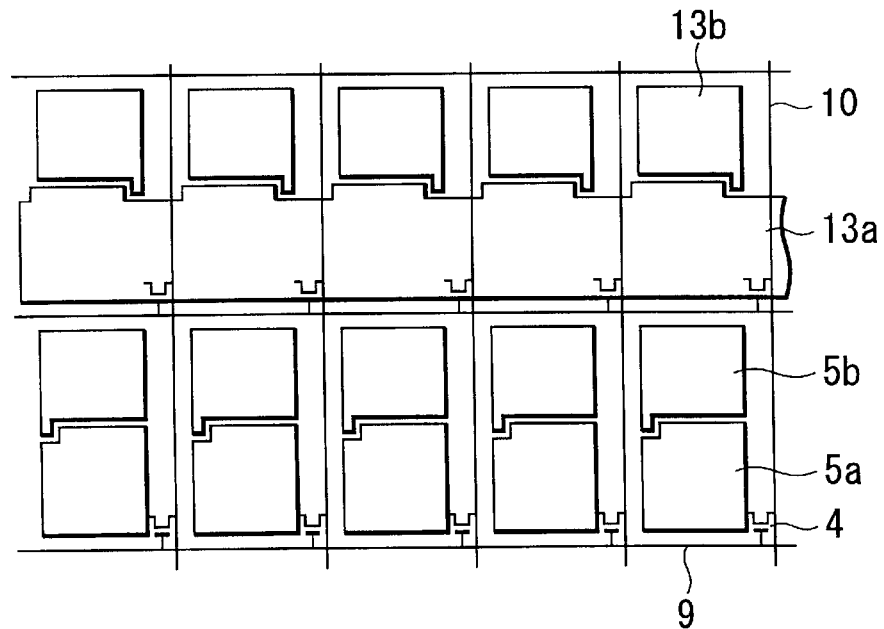
FIG. 19 is a partial plan view showing the arrangement of a liquid crystal display according to the ninth embodiment of the present invention.
Figure 20:
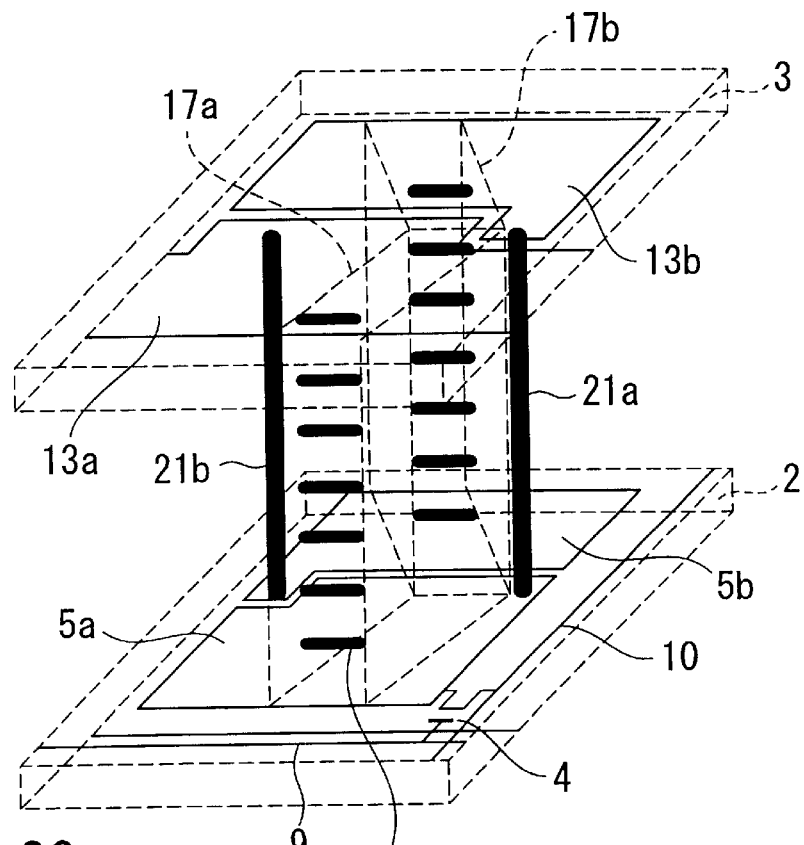
FIG. 20 is a schematic perspective view showing the relationship between the structure of the liquid crystal alignment according to the ninth embodiment and liquid crystal alignment.

FIG. 19 is a partial plan view of a liquid crystal display according to the ninth embodiment of the present invention. FIG. 20 is a schematic perspective view.

This ninth embodiment differs from the first embodiment in the following respects. Common electrodes 13a and 13b which were not comb electrodes were formed as two divided electrodes 13a and 13b in one pixel. A pixel electrode 5 was also divided into sub-pixel electrodes 5a and 5b. The electrode 13a was formed across pixels on the entire surface of a substrate 3. The sub-pixel electrode 5a was connected to the electrode 13b by a conductive columnar electrode 21a. The sub-pixel electrode 5b was connected to the electrode 13a by a columnar electrode 21b. To connect these columnar electrodes, projections (not shown) were formed on the opposing sides of the sub-pixel electrodes 5a and 5b and on the opposing sides of the electrodes 13a and 13b.

For simplicity, in FIG. 19 the pixel electrodes 5 and the common electrodes 13a and 13b are so drawn as not to overlap each other. In practice, however, these components oppose and overlap when viewed from the above.

Since the sub-pixel electrodes 5 and the common electrodes 13a and 13b are cross-connected by the columnar electrodes 21, voltages having opposite polarities are applied to liquid crystal materials in the regions of the sub-pixel electrodes 5a and 5b.

The columnar electrodes 21 have a height of 2 $\mu$m and hence also serve as spacers for controlling the spacing between a first substrate 2 and the second substrate 3.

A method of forming the columnar electrodes 21 is as follows. A photosensitive organic compound such as polyimide, a cyclobutane polymer, acryl, or epoxy is formed into the shapes of columns by a photolithography process. On the circumferential surfaces and upper surfaces of these columns, a metal film using, e.g., aluminum, nickel, chromium, molybdenum, tungsten, indium, tin, or copper, or a metal oxide film of any of these metals, is formed. Alternatively, the columns can be plated by using copper or the like.

Smectic layers were formed as follows. A cell was manufactured following the same procedures as in the first embodiment, and a liquid crystal material was injected into the cell. The resultant cell was heated to 90° C. in an oven. +25 V were applied to gate lines 9 to set the gates of TFT elements 4 in a normally ON state. +1 V was applied to signal lines 10, and 0 V was applied to capacitor lines and the counter electrodes 13. With these voltages kept applied, the cell was cooled from 90° C. to 25° C. at a rate of 10° C./min to form smectic layers. The polarity of the voltage applied to the liquid crystal material between the sub-pixel electrode 5a and the electrode 13a was opposite to the polarity of the voltage applied to the liquid crystal material between the sub-pixel electrode 5b and the electrode 13b. Consequently, the direction of the smectic layers on the sub-pixel electrode 5a was different from that on the sub-pixel electrode 5b.

Following the same procedures as in the first embodiment, polarizing plates, drivers, a backlight, and the like were attached to complete the liquid crystal display.

In this embodiment, the liquid crystal display can be driven by the same two methods as in the fifth embodiment. When the display was driven by the latter method in the fifth embodiment, the luminance when white was displayed increased to 1.25 times that in the first embodiment, and the contrast was 250:1. When the display was driven by the former method in the fifth embodiment, the contrast was 200:1. Compared to the fifth embodiment, only one TFT element 4 needed to be formed for each pixel. This increased the aperture ratio. The rest of the performance was identical with the first embodiment.

Note that when this liquid crystal display is driven by the latter method, image sticking sometimes occurs as in the fifth embodiment if white is displayed continuously. To prevent this, it is only necessary to perform driving as shown in FIG. 17.

When driving was performed as shown in FIG. 17, high-speed image display was possible. Also, when the ratio of t1 to t2 was 1:1, the contrast was 200:1.

TENTH EMBODIMENT

Figure 21:
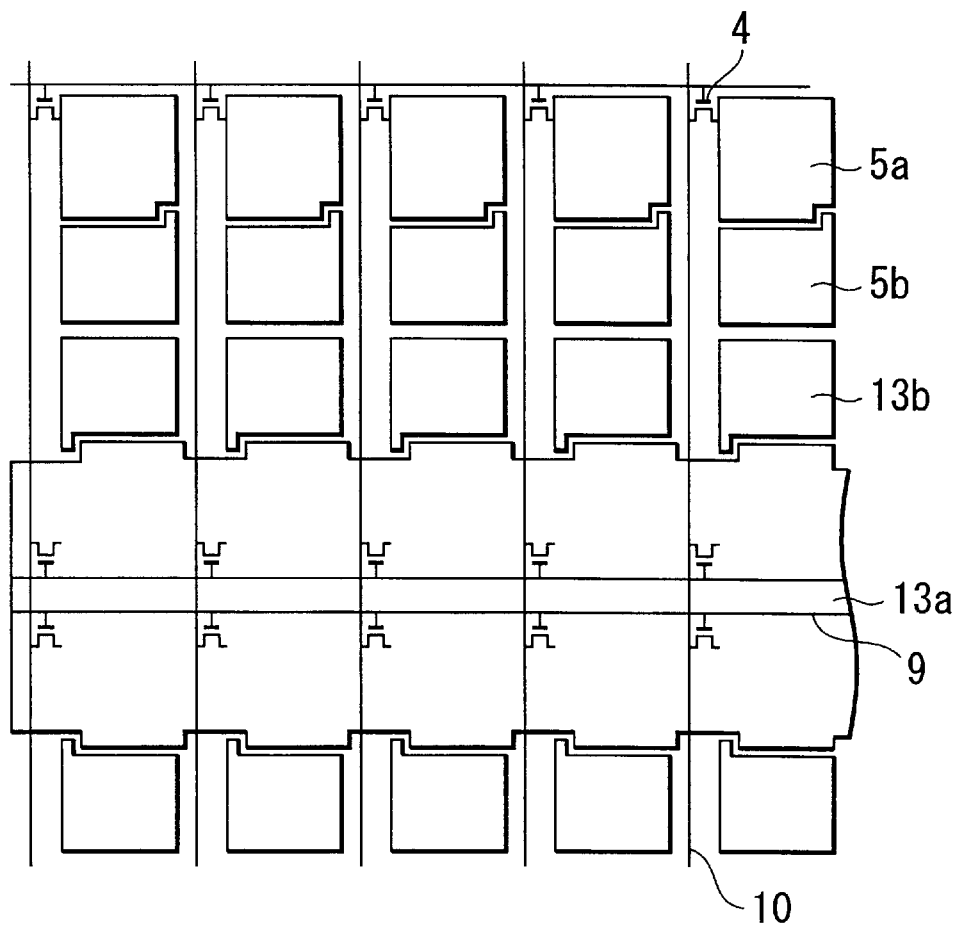
FIG. 21 is a partial plan view showing the arrangement of a liquid crystal display according to the tenth embodiment of the present invention.

FIG. 21 is a partial plan view of a liquid crystal display according to the tenth embodiment of the present invention.

This tenth embodiment differs from the liquid crystal display of the ninth embodiment in that adjacent two electrodes 13a were made into one piece having approximately double the width in the pixel pitch direction of the electrode 13a. The arrangement of gate lines for connecting these electrodes 13a is different from the ninth embodiment.

Note that the drawing of FIG. 21 is simplified as in FIG. 19.

Since the width in the pixel pitch direction of the electrode 13a was approximately doubled, the wiring resistance reduced. The rest of the performance of the liquid crystal display of this embodiment was identical with the ninth embodiment.

Note that the liquid crystal displays of the above embodiments use a color filter. However, color display can also be performed by a field sequential system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display, comprising:

a first substrate;

a second substrate opposing said first substrate;

a liquid crystal material sandwiched between said first and said second substrate and having spontaneous polarization which has one of a nematic phase and an isotropic phase on a high-temperature side of a chiral smectic C phase;

a first region of a portion of said liquid crystal material; and a second region of said liquid crystal material adjacent to said first region, wherein said liquid crystal material is aligned such that the direction of a smectic layer in said liquid crystal material in said first region is different from that in said liquid crystal material in said second region, and an angle the smectic layer in said first region makes with that in said second region is 115 to 155°.

2. The display according to claim 1, wherein said first substrate has a plurality of pixel regions, said first and said second region are present in each of said plurality of pixel regions, and the volumes of said first and said second region are substantially equal.

3. The display according to claim 1, wherein letting p be a chiral pitch of said liquid crystal material and d be a distance between said first and said second substrate, d<p.

4. The display according to claim 1, wherein a tilt angle of said liquid crystal material is substantially 22.5°.

5. The display according to claim 1, wherein said first substrate has a plurality of pixel regions, each of said plurality of pixel regions is divided into two regions correspondingly to said first and said second region, and a direction of a dividing line for dividing each of said plurality of pixel regions into said two regions is substantially parallel to an alignment direction of said liquid crystal material with no voltage applied.

6. The display according to claim 1, wherein said liquid crystal material aligns under a condition that a voltage of one polarity is applied to said liquid crystal material in said first region and a voltage of polarity opposite to the one polarity is applied to said liquid crystal material in said second region, when said liquid crystal material transits from one of the nematic phase and the isotropic phase to the chiral smectic C phase.

7. A liquid crystal display comprising:

a first substrate;

a second substrate opposing said first substrate;

a plurality of pixel electrodes formed on a surface of said first substrate which opposes said second substrate;

a pair of comb common electrodes formed on that surface of said second substrate, which opposes said first substrate, and having a plurality of interdigitated teeth; and a liquid crystal material sandwiched between said first and said second substrate and having spontaneous polarization which has one of a nematic phase and an isotropic phase on a high-temperature side of a chiral smectic C phase, wherein a direction of a smectic layer in said liquid crystal material in a first region sandwiched between one of said comb common electrodes and said pixel electrode is different from a direction of a smectic layer in said liquid crystal material in a second region sandwiched between the other of said comb common electrodes and said pixel electrode, and an angle the direction of the smectic layer in said first region makes with the direction of the smectic layer in said second region is 115 to 155°.

8. The display according to claim 7, wherein each of said plurality of pixel electrodes forms one pixel, said first and said second region are present in said pixel, and volumes of said liquid crystal material in said first and said second region are substantially equal.

9. The display according to claim 7, wherein letting p be a chiral pitch of said liquid crystal material and d be a distance between said first and said second substrate, d<p.

10. The display according to claim 7, wherein a tilt angle of said liquid crystal material is substantially 22.5°.

11. The display according to claim 7, wherein a longitudinal direction of said plurality of teeth of said comb common electrodes is substantially parallel to an alignment direction of said liquid crystal material with no voltage applied.

12. The display according to claim 7, wherein a pitch of said plurality of teeth of said comb common electrodes is shifted a substantially half period from a pitch of said plurality of pixel electrodes.

13. The display according to claim 7, wherein a pitch of said plurality of teeth of said comb common electrodes is not more than 500 $\mu$m.

14. The display according to claim 7, further comprising a plurality of capacitor lines formed on said first substrate so as to oppose a plurality of space portions between said plurality of interdigitated teeth of said comb common electrodes.

15. The display according to claim 7, wherein said liquid crystal material aligns under a condition that a voltage of one polarity is applied to said liquid crystal material in said first region and a voltage of polarity opposite to the one polarity is applied to said liquid crystal material in said second region, when said liquid crystal material transits from one of the nematic phase and the isotropic phase to the chiral smectic C phase.

* * * * *